US012439209B2

(12) United States Patent
Nguyen et al.

(10) Patent No.: US 12,439,209 B2
(45) Date of Patent: Oct. 7, 2025

(54) SPEAKER WITH IMPROVED FREQUENCY RESPONSE AND RELATED ELECTRONIC SOUND SIGNAL CIRCUIT, SOUND SYSTEM AND PRODUCTION METHOD

(71) Applicant: Sound Solutions International (Zhenjiang) Co., Ltd., Zhenjiang (CN)

(72) Inventors: Hong-Bi Dong Nguyen, Vienna (AT); Friedrich Reining, Vienna (AT)

(73) Assignee: Sound Solutions International (Zhenjiang) Co., Ltd., Zhenjiang (CN)

( * ) Notice: Subject to any disclaimer, the term of this patent is extended or adjusted under 35 U.S.C. 154(b) by 322 days.

(21) Appl. No.: 18/206,225

(22) Filed: Jun. 6, 2023

(65) Prior Publication Data

US 2023/0403512 A1 Dec. 14, 2023

(30) Foreign Application Priority Data

Jun. 10, 2022 (AT) .............................. A 50411/2022

(51) Int. Cl.
*H04R 9/04* (2006.01)
*H04R 7/04* (2006.01)
*H04R 9/02* (2006.01)

(52) U.S. Cl.
CPC ............... *H04R 9/046* (2013.01); *H04R 7/04* (2013.01); *H04R 9/025* (2013.01); *H04R 9/045* (2013.01);
(Continued)

(58) Field of Classification Search
CPC ........ H04R 9/046; H04R 9/025; H04R 9/045; H04R 7/04; H04R 9/06; H04R 1/24;
(Continued)

(56) References Cited

U.S. PATENT DOCUMENTS 5,828,767 A 10/1998 Button
2014/0321690 A1* 10/2014 Reining .................. H04R 9/02 381/396
(Continued)

FOREIGN PATENT DOCUMENTS

CN 210868073 U 6/2020
CN 215010699 U 12/2021
CN 114501259 A 5/2022
EP 2663092 A2 11/2013

OTHER PUBLICATIONS

Office Action issued for counterpart Austria patent application No. A50411/2022. Dated Nov. 15, 2022.

*Primary Examiner* — Carolyn R Edwards
*Assistant Examiner* — Julie X Dang
(74) *Attorney, Agent, or Firm* — Dykema Gossett PLLC

(57) ABSTRACT

The invention relates to a speaker (1) comprising a coil arrangement (2) with at least two voice coils (3*a,* 3*b*), a magnet system (4) and a membrane (10) being fixed to the coil arrangement (2) and the magnet system (4). The membrane (10) has a first compliance ($c_1$) and together with the coil arrangement (2) causes a first resonance frequency ($fres_1$) for an oscillation of the membrane (10). In addition, the speaker (1) comprises a second connector (14, 17, 17*a,* 17*b,* 24, 25*a,* 25*b*) with a second compliance ($c_2$), which interconnects the voice coils (3*a,* 3*b*). The second connector (14, 17, 17*a*, 17*b,* 24, 25*a*, 25*b*) together with the voice coils (3*a,* 3*b*) causes a higher second resonance frequency ($fres_2$) for the oscillation of the membrane (10). Moreover, the invention relates to an electronic sound signal circuit (18), which is designed to output coil signals (SO1, SO2) having a frequency dependent phase shift ($\varphi$). In addition, invention relates to a sound system comprising an electronic sound signal circuit and a speaker of the above kind and to a method for manufacturing a coil arrangement (2).

39 Claims, 15 Drawing Sheets

(52) U.S. Cl.
CPC .. *H04R 2209/024* (2013.01); *H04R 2209/041* (2013.01)

(58) Field of Classification Search
CPC ........ H04R 2209/024; H04R 2209/041; H04R 3/00; H04R 31/006; H04R 7/18; H04R 9/02; H04R 2499/11; H04R 2307/207; H04R 7/06; H04R 2307/025; H04R 2231/003; H04R 2231/001; H04R 2307/204; H04R 7/20; H04R 2400/11; H04R 9/041; H04R 1/025; H04R 7/16; H04R 1/028; H04R 7/12; H04R 7/10; H04R 2499/15
USPC .................................................. 381/400–421
See application file for complete search history.

(56) References Cited

U.S. PATENT DOCUMENTS

| | | | | |
|---|---|---|---|---|
| 2018/0279052 | A1* | 9/2018 | Reining ................. | H04R 9/025 |
| 2019/0104369 | A1* | 4/2019 | Kim ....................... | H04R 9/043 |
| 2020/0128332 | A1* | 4/2020 | Otto ......................... | H04R 9/06 |
| 2020/0137500 | A1* | 4/2020 | Moenke ................... | H04R 7/04 |
| 2021/0368276 | A1 | 11/2021 | Otto et al. | |
| 2021/0368277 | A1 | 11/2021 | Otto et al. | |
| 2022/0150638 | A1* | 5/2022 | Song ........................ | H04R 7/20 |
| 2023/0086434 | A1* | 3/2023 | Yang ...................... | H04R 13/00 381/412 |
| 2023/0217177 | A1* | 7/2023 | Yang ........................ | H04R 9/06 381/412 |

* cited by examiner

SPEAKER WITH IMPROVED FREQUENCY RESPONSE AND RELATED ELECTRONIC SOUND SIGNAL CIRCUIT, SOUND SYSTEM AND PRODUCTION METHOD

PRIORITY

This patent application claims priority from Austrian patent application No. A50411/2022, filed Jun. 10, 2022, the disclosure of which is incorporated herein, in its entirety, by reference.

BACKGROUND

The invention relates to a speaker, which comprises a coil arrangement with at least two voice coils, a magnet system and a membrane. Each of the voice coils has an electrical conductor in the shape of loops running around a coil axis in a loop section. The voice coils are annular when viewed in a direction parallel to the coil axis, each have an inner circumference and an outer circumference and are arranged over one another in said direction. The magnet system is designed to generate a magnetic field transverse to the conductors of the voice coils in the loop section. The membrane is fixed to the coil arrangement and directly or indirectly to the magnet system. The membrane forms a first connector between the coil arrangement and the magnet system with a first compliance, and the membrane together with the coil arrangement causes a first resonance frequency for an oscillation of the membrane in a direction parallel to the coil axis.

Moreover, the invention relates to an electronic sound signal circuit, which comprises a sound input, which is designed to receive a sound input signal, and at least two sound outputs, which each are designed to feed a coil signal to one of the voice coils of a coil arrangement of a speaker.

Additionally, the invention relates to a sound system, which comprises an electronic sound signal circuit and a speaker of the above kind, wherein the sound outputs of the electronic sound signal circuit each are connected with a voice coil of the coil arrangement.

Finally, the invention relates to a method of manufacturing a coil arrangement, which comprises the steps of:

- providing at least two voice coils, wherein each of the voice coils has an electrical conductor in the shape of loops running around a coil axis in a loop section, wherein the voice coils are annular when viewed in a direction parallel to the coil axis and wherein each voice coil has an inner circumference and an outer circumference;
- applying a glue layer or glue pads on at least one of the voice coils of the coil arrangement;
- arranging the voice coils over one another in a direction parallel to the coil axis;
- connecting the voice coils of the coil arrangement by gluing them together by use of the glue layer or glue pads; and
- moving the voice coils to each other until a desired gap between the same is obtained.

A speaker, an electronic sound signal circuit, a sound system and a manufacturing method of the above kinds are generally known in prior art.

An electrical sound input signal fed to the voice coil generates a force in the magnetic field of the magnet system and causes a movement between the coil arrangement and the magnet system. In turn the membrane moves according to the electric sound input signal. As a consequence, sound corresponding to the electric sound input signal is emanated from the membrane.

There is a general ambition to reduce power consumption and to improve efficiency of technical devices. This is particularly true for mobile devices, the operating time of which substantially depend on the efficiency of the inbuilt systems. So, there is also an ambition to reduce power consumption and to improve efficiency of sound systems in general and in particular of sound systems of mobile devices.

BRIEF SUMMARY

Thus, it is an object of the invention to provide a better speaker, a better electronic sound signal circuit, a better sound system and a better manufacturing method. In particular, the efficiency of the sound system shall be improved.

The object of the invention is solved by a speaker as defined in the opening paragraph, wherein the speaker in addition comprises a second connector with a second compliance, wherein the second connector connects the voice coils of the coil arrangement, wherein the second connector together with the voice coils of the coil arrangement causes a second resonance frequency for the oscillation of the membrane in a direction parallel to the coil axis and wherein the second resonance frequency is above the first resonance frequency.

Moreover, the object of the invention is solved by an electronic sound signal circuit as defined in the opening paragraph, wherein the electronic sound signal circuit is designed to output coil signals corresponding to the sound input signal in terms of their time course but being phase shifted to each other, wherein the phase shift depends on the frequency of the sound input signal.

In addition, the object of the invention is solved by a sound system, which comprises an electronic sound signal circuit and a speaker of the above kind, wherein the sound outputs of the electronic sound signal circuit each are connected with a voice coil of the coil arrangement.

Finally, the object of the invention is solved by a manufacturing method as defined in the opening paragraph, wherein the voice coils are moved to each other until a desired gap between the same is obtained, wherein the glue layer or glue pads reach(es) to the inner circumferences of the voice coils at each position of a desired glue bead arranged on the inner circumferences of the voice coils and to the outer circumferences of the voice coils at each position of a desired glue bead arranged on the outer circumferences of the voice coils and wherein additionally the voice coils of the coil arrangement are connected by applying glue beads to the voice coils at the aforementioned positions.

By the above measures, the speaker provides a second resonance frequency, by which the frequency response of the speaker can be influenced and improved. The second resonance frequency is above the first resonance frequency and hence the frequency response of the speaker can be improved at higher frequencies. To achieve that, the voice coils receive coil phase shifted coil signals. By doing so, the sound system can be tuned or designed in a way that the frequency response gets a peak at the second resonance frequency. At the same time, the power consumption of the sound system is reduced at this second resonance frequency. Accordingly, overall efficiency can be improved by the proposed measures. In addition, the proposed method allows for provision of an advantageous coil arrangement for a speaker or sound system of the above kind. In detail, the glue layer or glue pads hinder the glue beads from reaching into the gap between the voice coils what could deteriorate the quality of the output sound.

Generally, the first resonance frequency results from a common movement of the voice coils, whereas the second resonance frequency results from a movement of the voice coils relative to each other or with different speeds respectively. The membrane oscillation in question refers to its piston movement. It should also be noted that additional factors, which influence the first resonance frequency and the second resonance frequency shall not be excluded, but anyway the first resonance frequency is mainly caused by the membrane together with the coil arrangement and the second resonance frequency is mainly caused by the second connector together with the voice coils.

The proposed measures apply to speakers in general and particularly to micro speakers, whose membrane area is smaller than 600 $mm^2$ and/or whose back volume is in a range from 200 $mm^3$ to 2 $cm^3$. Such micro speakers are used in all kinds of mobile devices such as mobile phones, mobile music devices, laptops and/or in headphones. It should be noted at this point, that a micro speaker does not necessarily comprise its own back volume but can use a space of a device, which the speaker is built into, as a back volume. That means, the speaker does not necessarily comprise its own (closed) housing but can comprise just an (open) frame. The back volume of the devices, which such speakers are built into, typically is smaller than 10 $cm^3$.

The electrical conductor of the voice coils can have a circular cross section and form a coil wire or can be flat and form a coil foil. A diameter of a coil wire of micro speakers beneficially is ≤110 μm. The electrical conductor can also comprise a (electrically insulating) coating on the metal core as the case may be. The coil foil can be stacked with a glue layer in-between to form a voice coil. The second connector may also comprise a plurality of wires electrically connecting the voice coils of the coil arrangement.

Beneficially a distance or gap between adjacent voice coils in their idle position is in range of 5 to 150 μm when measured in a direction parallel to the coil axis. In this way, the efficiency of the speaker at high frequencies can be improved in a good way.

The proposed measures in particular apply to speakers, wherein the coil arrangement comprises a first voice coil, which is mounted to the membrane, and a second voice coil, which is connected to the first voice coil by the second connector. In other words, the proposed measures in particular apply to speakers with just two voice coils where the coil arrangement forms a two-mass spring system. However, the proposed measures also apply to more complex systems with more than two voice coils oscillating to each other. Such a system then has more than a second resonance frequency. Accordingly, the frequency response of a speaker can be influenced even more then.

Further details and advantages of the proposed speaker, the proposed electronic sound signal circuit, the proposed sound system and the proposed manufacturing method will become apparent in the following description and the accompanying drawings.

Beneficially, the second resonance frequency is below 30 kHz. In this way, the peak of the frequency response of the speaker at the second resonance frequency, considered it is broad enough, can reach into the region of audible sound and improve the efficiency of the speaker at very high frequencies. To improve said effect, the second resonance frequency may also be below 25 kHz and even below 20 kHz. However, one should note that the proposed speaker, the proposed electronic sound signal circuit, the proposed sound system and the proposed manufacturing method in principle also apply to ultrasonic systems.

Beneficially, the second resonance frequency is at least three times higher than the first resonance frequency, in particular at least ten times higher than the first resonance frequency. In this way, the first resonance frequency and the second resonance frequency and their associated peaks in the frequency response of the speaker are considerably spaced from each other.

Beneficially, a variable $K_1$ in the equation $$K_1=c_1\cdot(m_1+m_2+m_3)$$

is in a range of $1.0\cdot10^{-8}$ to $6.5\cdot10^{-7}$, in particular in a range of $2.5\cdot10^{-8}$ to $1.5\cdot10^{-7}$, wherein $c_1$ is the first compliance of the first connector or membrane, $m_1$ is the mass of the first voice coil, $m_2$ is the mass of the second voice coil and $m_3$ is the mass of a rigid part or dome of the membrane. In this way, the first resonance frequency can be set in a range of 200 Hz to 1.6 kHz and in particular in a range of 410 Hz to 1 kHz.

Furthermore, it is beneficial if a variable $K_2$ in the equation $$K_2=\frac{c_1\cdot c_2}{c_1+c_2}\cdot\frac{(m_1+m_3)\cdot m_2}{m_1+m_2+m_3}$$

is in a range of $1.0\cdot10^{-10}$ to $4.0\cdot10^{-10}$, in particular in a range of $2.0\cdot10^{-10}$ to $3.0\cdot10^{-10}$, wherein $c_1$ is the first compliance of the first connector or membrane, $c_2$ is the second compliance of the second connector, $m_1$ is the mass of the first voice coil, $m_2$ is the mass of the second voice coil and $m_3$ is the mass of a rigid part or dome of the membrane. In this way, the second resonance frequency can be set in a range of 8 kHz to 16 kHz and in particular in a range of 9.2 kHz to 11.2 kHz.

Beneficially, a stiffness or spring constant of the second connector can be set in a range of 0.01 N/μm to 0.1 N/μm or a compliance of the second connector can be set in a range of 10 μm/N to 100 μm/N respectively. These measures also support a peak of the frequency response of the speaker in a useful range.

Beneficially, a quality factor of the second resonance frequency caused by the second connector is in a range of 1 to 20. These measures support a peak of the frequency response of the speaker with an advantageous width and avoid distortions of the output sound respectively.

In one embodiment of the speaker, the second connector is embodied as or comprises a glue layer between the voice coils of the coil arrangement. Here, the glue layer fully covers connection areas of the voice coils, which connection areas face each other and are oriented perpendicular to the coil axis. By the proposed measures, a long lasting connection of the voice coils is obtained.

Alternatively, the second connector can comprise a plurality of sub parts, which each is embodied as or comprises a glue pad connecting the voice coils of the coil arrangement. The glue pads partly cover connection areas of the voice coils, which connection areas face each other and are oriented perpendicular to the coil axis. By the proposed measures, a long lasting connection of the voice coils is obtained, too. However, the spring constant of the second connector can be decreased in view of a glue layer of the same material, which fully covers connection areas of the voice coils.

Advantageously, the glue layer or glue pads is/are made of plastics having a Shore hardness from 00-5 to A-20 and/or an elongation at tear of more than 100%. Shore hardness is a measure indicating how soft or how rigid the material is. The Shore 00 scale is used for extra soft materials, the Shore A scale is used for soft materials and the Shore D scale is used for semi-rigid and hard materials. Accordingly, a comparable soft material is proposed for the glue layer or glue pads, which does not contribute much to a spring constant of the second connector.

It should be noted that a "glue layer" or a "glue pad" in the context of this disclosure in particular includes glues, which are applied on the voice coils in the liquid or pasty form, as well as strips or pads with an adhesive layer on one or both sides. Said strips or pads can be made of a continuous or foamed material. Accordingly, a "glue layer" or a "glue pad" in the context of this disclosure also includes "gaskets" (whose sealing function is not in the focus here).

In another embodiment, the second connector comprises a plurality of sub parts, which each is embodied as or comprises a glue bead connecting the voice coils of the coil arrangement at their inner circumferences or outer circumferences. In particular, the glue beads can run in a direction parallel to the coil axis. In this way, the voice coils are connected to each other by a kind of "glue posts". By variation of a count, a cross section and a material of the glue beads, the spring constant of the second connector can be influenced in a very good way.

Advantageously, the glue beads are made of plastics having a Shore hardness from A-20 to D-50 and/or an elongation at tear of more than 200%. In this way, the glue beads can considerably contribute to the spring constant of the second connector despite a comparably small cross sectional area of the same.

In yet another embodiment, the second connector comprises a plurality of sub parts, which each is embodied as a strip connecting the voice coils of the coil arrangement and which runs along the inner circumferences or outer circumferences of the connected voice coils and is attached thereto. A "strip" is a body, which has a thickness extending in a first orthogonal direction, a width extending in a second orthogonal direction and a length extending in a third orthogonal direction, wherein the width and the length of the strip are substantially larger than its thickness. The length may be substantially larger than the width in case of that the strip is long, but the length may also be the same as the width in case of that the strip is short. It should be noted that the strip running along the inner circumferences or outer circumferences of the connected voice coils may get a more complex spatial shape with different total extensions, e.g. when it does not run straight but along roundings or corners. However, within small sections the above stays true. In particular, the strip can have an adhesive layer, by which the same is attached to the voice coils. By variation of a count, a cross section and a material of the strips, the spring constant of the second connector can be influenced in a very good way, too.

Advantageously, the strip can comprise one or more corrugations. In this way, the compliance of the strip can be influenced by giving the same a special shape. In particular a corrugation can run along a gap between the voice coils of the coil arrangement. In this way, similar spring characteristics both for tension (i.e. when the voice coils move away from each other) and compression (i.e. when the voice coils move towards each other) can be obtained.

Beneficially, the thickness of a strip can be in a range of 5 μm to 50 μm. in particular in a range of 5 μm to 20 μm. By these measures, the strip has enough long term stability and provides spring characteristics in a useful range.

Advantageously, the strip can be made of or comprise a thermoplastic elastomer with a Young's Modulus of 2 MPa to 2 Gpa or a thermoplastic with a Young's Modulus of 100 MPa to 12 Gpa. By these measures, the strip has enough long term stability and provides spring characteristics in a useful range as well.

"Plastic" in the given context in particular can be: (a) any member of the group of thermoplastics; (b) any combination of one or more of thermoplastic layers with one or more layers of acrylate, urethane, rubber, silicone or silane-modified polymer; (c) any member of the group of thermoplastic elastomers (TPE) or thermoplastic rubbers respectively; (d) any combination of one or more of thermoplastic elastomer layers with one or more layers of acrylate, urethane, rubber, silicone or silane-modified polymer; (e) any blend of thermoplastic elastomers; (f) any member of the group of rubbers and in particular silicone rubbers; (g) any combination of one or more layers of silicone rubbers with one or more layers of acrylate, urethane, rubber, silicone or silane-modified polymer; or (h) any combination of thermoplastics layers and/or thermoplastic elastomers and/or silicone rubbers and/or acrylate, urethane, rubber, silicone or silane-modified polymer layers.

"Thermoplastics" in the above context in particular can be Polyether ether ketone (PEEK, PEAK), Polycarbonate (PC), Polyetherimide (PEI), Polyethylene terephthalate (PET), Polyethylene naphthalate (PEN) or Polybutylene terephthalate (PBT).

"Thermoplastic elastomers" or "thermoplastic rubbers" in the above context in particular can be thermoplastic polyurethanes (TPU) or thermoplastic copolyester (TPC, TPE-E).

In case of silicone rubbers, the same may be provided as silicone sheets or can be sprayed.

In yet another embodiment, the second connector can comprise a plurality of sub parts, which each is embodied as a first spring arm connecting or coupling the voice coils of the coil arrangement and which together form a first spring arrangement. In particular, the first spring arms can be made of or comprise a metal. "Metals" in the given context in particular can be aluminum and its alloys, copper, and its alloys and stainless steel. In this way, very good spring characteristics can be obtained for the second connector.

Beneficially, the speaker can additionally comprise an arrangement of second spring arms each having a first end and a second end, wherein each of the second spring arms at its first end connects to the second voice coil, at its second end connects to a frame of the speaker and at a connecting point displaced from both end points connects to a first spring arm of the first spring arrangement. In this way, the movement of the coil arrangement can be stabilized and the first and second resonance frequency can be influenced. In particular, the second spring arms can act as a suspension system. The second spring arms can also be seen as a third connector between the coil arrangement and the common frame, which increases the first resonance frequency for the oscillation of the membrane in a direction parallel to the coil axis without further measures. To keep the first resonance frequency low, the first connector should be made softer in accordance with the added stiffness of the third connector. In particular, the second spring arm can be made of or comprise a metal. "Metals" in the given context in particular again can be aluminum and its alloys, copper, and its alloys and stainless steel.

In a very advantageous embodiment, the voice coils can be shaped like a polygon when viewed in a direction parallel to the coil axis, wherein the sub parts are arranged in the corners of the polygon, in particular exclusively arranged in the corners of the polygon. That means one or more glue pads, one or more glue beads, one or more stripes and/or one or more first spring arms can be arranged in a corner of a polygonal coil. In this way the sub parts are arranged in a region where the magnetic flux usually is not very high and hence does not contribute to a movement of the voice coils much anyway.

In another advantageous embodiment, the voice coils are shaped like a polygon when viewed in a direction parallel to the coil axis, wherein the sub parts are arranged at the longitudinal sides of the polygon, in particular exclusively arranged at the longitudinal sides. That means one or more glue pads, one or more glue beads, one or more stripes and/or one or more first spring arms can be arranged at the longitudinal sides of a polygonal coil. In this way, in particular lengthy sub parts like stripes can be used for connecting the voice coils.

Generally, a glue layer or glue pads, glue beads, strips and first spring arms may be used alone in any desired combination. For example, in very advantageous solution, the second connector comprises a glue layer or glue pads between the voice coils of the coil arrangement and the second connector in addition comprises glue beads, which connect the voice coils of the coil arrangement at their inner circumferences or outer circumferences. By these measures, the advantageous features of a glue layer or glue pads and glue beads are combined. For example, the glue layer or glue pads can consist of a very soft material, whereas the glue beads can be formed by a stronger material.

It is very advantageous in the above context if the glue layer or the glue pads reach to the inner circumferences of the voice coils at each of the glue beads being arranged on said inner circumferences, and reach to the outer circumferences of the voice coils at each of the glue beads being arranged on said outer circumferences.

In this embodiment, glue layer or glue pads hinder the glue beads from reaching into the gap between the voice coils what could deteriorate the quality of the output sound. At this point, reference is also made to the proposed manufacturing method.

Beneficially, the voice coils are shaped like a polygon when viewed in a direction parallel to the coil axis and the glue pads and the glue beads are arranged in the corners of the polygon. In other words the voice coils are shaped like a polygon when viewed in a direction parallel to the coil axis, wherein the second connector comprises a glue layer or glue pads between the voice coils of the coil arrangement arranged in the corners of the polygon, and wherein the second connector in addition comprises glue beads, which connect the voice coils of the coil arrangement at their inner circumferences or outer circumferences and which are arranged in the corners of the polygon, too. In this way the given sub parts are arranged in a region where the magnetic flux usually is not very high and hence does not contribute to a movement of the voice coils much anyway.

In yet another beneficial embodiment, the second connector in addition can comprise a plurality of strips connecting the voice coils of the coil arrangement which run along the inner circumferences or outer circumferences of the connected voice coils at the longitudinal sides of the polygon and which are attached thereto. In this way, the stability of the coil arrangement can be improved. In particular, corrugated strips can be used so that the same provide similar characteristics both for tension and compression.

In another advantageous embodiment, the voice coils are shaped like a polygon when viewed in a direction parallel to the coil axis, the second connector comprises a glue layer or glue pads between the voice coils of the coil arrangement arranged in the corners of the polygon, and the second connector in addition comprises a plurality of strips connecting the voice coils of the coil arrangement which run along the inner circumferences or outer circumferences of the connected voice coils at the longitudinal sides of the polygon and which are attached thereto. By these measures, the advantageous features of a glue layer or glue pads and strips are combined. For example, the glue layer or glue pads can consist of a very soft material, whereas the strips can be formed by a stronger material.

Generally, the voice coils can be identical or can be different. If they are identical, the manufacturing of the coil arrangement can be eased. If they are different, the frequency response of the speaker can further be influenced. For example, the voice coils may be made of different materials, may have different numbers of windings, may have different mass and/or may have different height.

Beneficially, the phase shift in an electronic sound signal circuit can be <5° below a threshold frequency and then can rise above the threshold frequency. In that, the generation of a considerable peak in the frequency response of the speaker at the second resonance frequency is supported.

Furthermore it is beneficial if the threshold frequency is between the first resonance frequency and the second resonance frequency. In that, the generation of a considerable peak in the frequency response of the speaker at the second resonance frequency is supported as well. For example, the threshold frequency can be in a range from 3 kHz to 6 kHz.

Beneficially, the electronic sound signal circuit can comprise an electronic phase shifter, which is provided to perform the phase shifting of the coil signals. In this way, proven means are used to perform the desired phase shifting. For example, the electronic phase shifter can be embodied as an allpass filter, which can be realized by passive or active analog circuits as well as by digital circuits. The non phase shifted coil signal may be delayed by a delay circuit to consider a phase-independent delay of the electronic phase shifter (i.e. a delay, which is also existent at a phase shift of 0°).

In an advantageous embodiment of the electronic sound signal circuit, the maximum coil signals output by the electronic sound signal circuit are smaller than coil signals, which cause a body contact between the voice coils of the coil arrangement. By these measures, quality of output sound is not deteriorated by body contact of the voice coils.

In one embodiment, the at least two sound outputs of the electronic sound signal circuit each can be formed by two wires per voice coil. In detail, a first amplifier of the electronic sound signal circuit can be connected to the first voice coil by means of two wires, and a second amplifier of the electronic sound signal circuit can be connected to the second voice coil by means of further two wires.

In another very advantageous embodiment of the electronic sound signal circuit, the at least two sound outputs each are formed by a first single wire per voice coil and a second common wire, which is shared between two voice coils. So, in view of the aforementioned embodiment, one sound output and one wire can be saved. For example, three half bridges each having two serial transistors can be connected to the sound outputs of the electronic sound signal circuit. It should be noted in this context that load or current carried by the half bridge connected to the common sound output or common wire may reach twice the load or current carried by the other half bridges. Accordingly, the common half bridge can be made with transistors, which allow for a higher current than the transistors of the other half bridges. It is also possible to use the same transistors for all half bridges and to double the common half bridge. That means that there are two parallel common half bridges then. In that, production of the electronic sound signal circuit can be eased. One another possibility for using the same transistors is to overdimension the transistors of the half bridges connected to the single outputs or wires.

BRIEF DESCRIPTION OF THE DRAWINGS

These and other aspects, features, details, utilities, and advantages of the invention will become more fully apparent from the following detailed description, appended claims, and accompanying drawings, wherein the drawings illustrate features in accordance with exemplary embodiments of the invention, and wherein:

Like reference numbers refer to like or equivalent parts in the several views.

DETAILED DESCRIPTION

Figure 1:
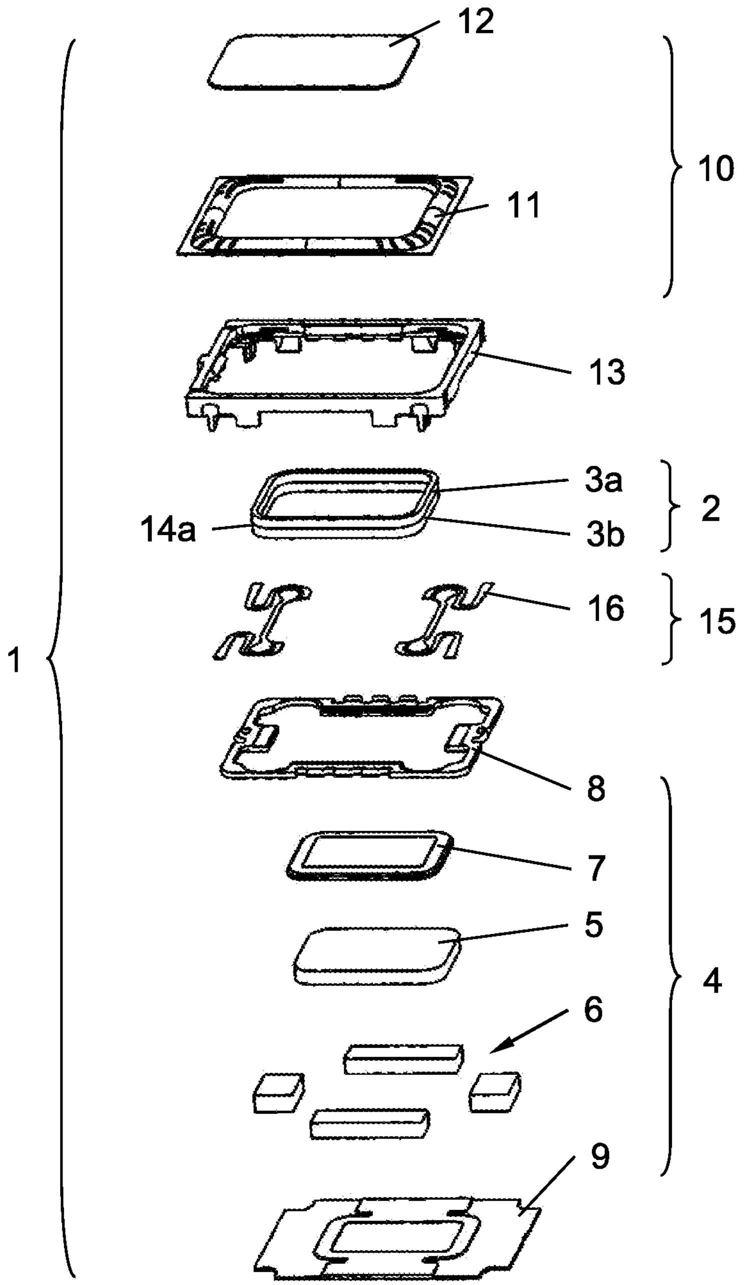
FIG. 1 shows an example of a speaker in exploded view.

Various embodiments are described herein to various apparatuses. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It must be noted that, as used in this specification and the appended claims, the singular forms "a," "an" and "the" include plural referents unless the content clearly dictates otherwise.

The terms "first," "second," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," "have," and any variations thereof, are intended to cover a non-exclusive inclusion, such that a process, method, article, or apparatus that comprises a list of elements is not necessarily limited to those elements but may include other elements not expressly listed or inherent to such process, method, article, or apparatus.

All directional references (e.g., "plus", "minus", "upper", "lower", "upward", "downward", "left", "right", "leftward", "rightward", "front", "rear", "top", "bottom", "over", "under", "above", "below", "vertical", "horizontal", "clockwise", and "counterclockwise") are only used for identification purposes to aid the reader's understanding of the present disclosure, and do not create limitations, particularly as to the position, orientation, or use of the any aspect of the disclosure. It is to be understood that the terms so used are interchangeable under appropriate circumstances such that the embodiments of the invention described herein are, for example, capable of operation in other orientations than those illustrated or otherwise described herein.

As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose.

Joinder references (e.g., "attached", "coupled", "connected", and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

All numbers expressing measurements and so forth used in the specification and claims are to be understood as being modified in all instances by the term "about" or "substantially", which particularly means a deviation of ±10% from a reference value.

Figure 2:
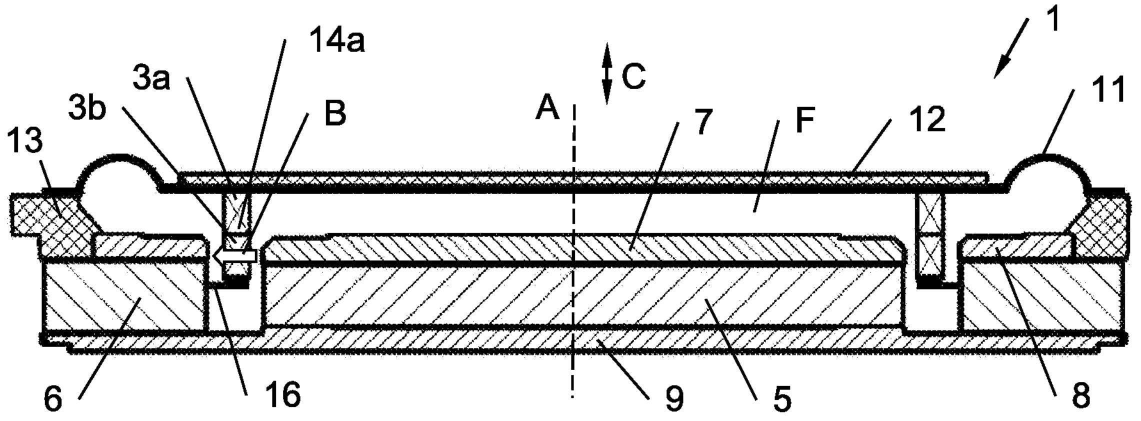
FIG. 2 shows the speaker of FIG. 1 in sectional view.
Figure 3:
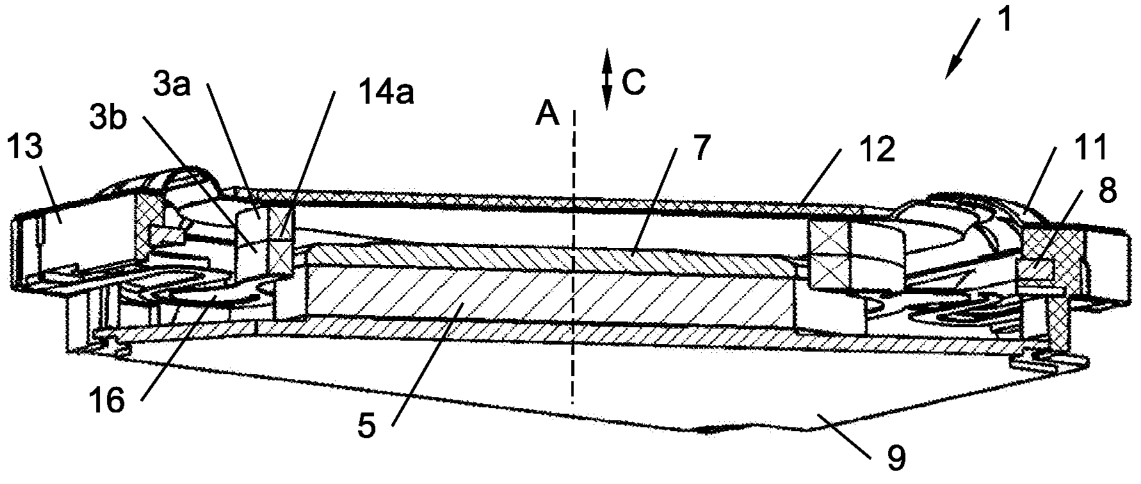
FIG. 3 shows an angular cross sectional view of the speaker of FIG. 1 from below.

An example of a speaker 1 is disclosed by use of the FIGS. 1 to 3. FIG. 1 shows an exploded view of the speaker 1, FIG. 2 shows a cross sectional view of the speaker 1, and FIG. 3 shows an angular cross sectional view of the speaker 1 from below.

The speaker 1 comprises a coil arrangement 2 with at least two voice coils 3*a*, 3*b*, wherein each of the voice coils 3*a*, 3*b* has an electrical conductor in the shape of loops running around a coil axis A in a loop section, wherein the voice coils 3*a*, 3*b* are annular when viewed in a direction parallel to the coil axis A, wherein the voice coils 3*a*, 3*b* each have an inner circumference and an outer circumference and wherein the voice coils 3*a*, 3*b* are arranged over one another in said direction. For example, a diameter of a metal core of the electrical conductor of the voice coils 3*a*, 3*b* can be ≤110 μm and/or the electrical conductor can also comprise an (electrically insulating) coating on the metal core. Alternatively, also a metal foil may be used for the electrical conductor. In this example, the voice coils 3*a*, 3*b* are shaped like a polygon when viewed in a direction parallel to the coil axis A. In particular, the voice coils 3*a*, 3*b* are rectangular. However, other shapes are possible as well. For example, the voice coils 3*a*, 3*b* may be oval or circular or may have a different number of corners.

Furthermore, the speaker 1 comprises a magnet system 4, which is designed to generate a magnetic field B transverse to the conductors of the voice coils 3*a*, 3*b* in the loop section. The magnet system 4 in this example comprises a center magnet 5 and outer magnets 6 as well as a center top plate 7 from soft iron, an outer top plate 8 from soft iron and a bottom plate 9 from soft iron. The center magnet 5 is mounted to the bottom plate 9 and to the center top plate 7, and the outer magnets 6 are mounted to the bottom plate 9 and to the outer top plate 8.

Moreover, the speaker 1 comprises a membrane 10, which in this example comprises a flexible membrane part 11 and a rigid membrane part 12 in the shape of a plate. However, the rigid membrane part 12 is just optionally and may be omitted. In this case, the membrane 10 comprises only a flexible membrane part 11 or is flexible as whole respectively. The membrane 10 is fixed to the coil arrangement 2 and to the magnet system 4. Accordingly, the membrane 10 forms a first connector between the coil arrangement 2 and the magnet system 4 and has a first compliance based on its flexible membrane part 11. In more detail, the membrane 10 is fixed to the coil arrangement 2 and to the magnet system 4 at its backside. At the backside of the membrane 10 an optional back volume F may be formed like this is the case in the example of FIGS. 1 to 3.

In this example, the speaker 1 comprises an optional frame 13, via which the membrane 10 (concretely its flexible membrane part 11) is fixed to the magnet system 4. Hence, the membrane 10 is indirectly fixed to the magnet system 4 in this example. However, the membrane 10 may also directly be fixed to the magnet system 4 in an alternative embodiment. In the latter case, a frame 13 may be omitted.

In addition, the speaker 1 comprises a second connector 14*a*, which connects the voice coils 3*a*, 3*b* of the coil arrangement 2 and which has a second compliance. Because of its compliance, the second connector 14*a* allows a relative movement of the voice coils 3*a*, 3*b* to each other in an excursion direction C parallel to the coil axis A.

In this embodiment, the second connector 14*a* is embodied as a flexible glue layer between the voice coils 3*a*, 3*b* of the coil arrangement 2. However, there are various possibilities to embody the second connector 14*a* which are disclosed later in detail. For example, a second connector in general may be embodied by or may comprise glue pads, strips, glue beads and first spring arms, which connect or couple the voice coils 3*a*, 3*b* and which form a first spring arm arrangement.

Finally, the speaker 1 comprises an optional second spring arm arrangement 15, which comprises a plurality of second spring arms (or legs or levers) 16 connecting the coil arrangement 2 and the magnet system 4 and which like the flexible membrane part 11 allows a relative movement between the coil arrangement 2 and said magnet system 4 in the excursion direction C parallel to the coil axis A. In this example, the second spring arm arrangement 15 comprises two spring arm sub arrangements each having two second spring arms 16. Alternatively, single second spring arms 16 or a spring arm sub arrangement with even more (e.g. four) second spring arms 16 can be used. In particular, the second spring arms 16 can act as a suspension system.

In this example, the membrane 10 (in detail its flexible membrane part 11), the outer magnets 6, the outer top plate 8 and the bottom plate 9 are mounted to the frame 13. However, the frame 13 may be shaped different than depicted and may hold together a different set of parts. For example, it may be connected only to the outer magnets 6 or to the outer top plate 8. It should also be noted that the second spring arm arrangement 15 does not necessarily connect the coil arrangement 2 and the magnet system 4 directly, but it may also connect them (indirectly) via the frame 13 for example.

Figure 4:
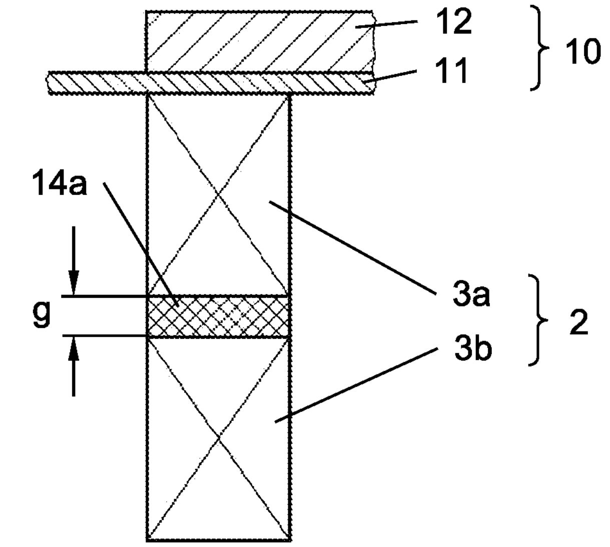
FIG. 4 shows a detailed sectional view of a coil arrangement with a part of a membrane and a second connector embodied as a glue layer.

FIG. 4 shows a detailed sectional view of a coil arrangement 2 with a part of a membrane 10 and the glue layer 14*a*. Note that there is no optional second spring arm arrangement 15. FIG. 4 also explicitly shows the gap g between the two voice coils 3*a*, 3*b*.

Figure 5:
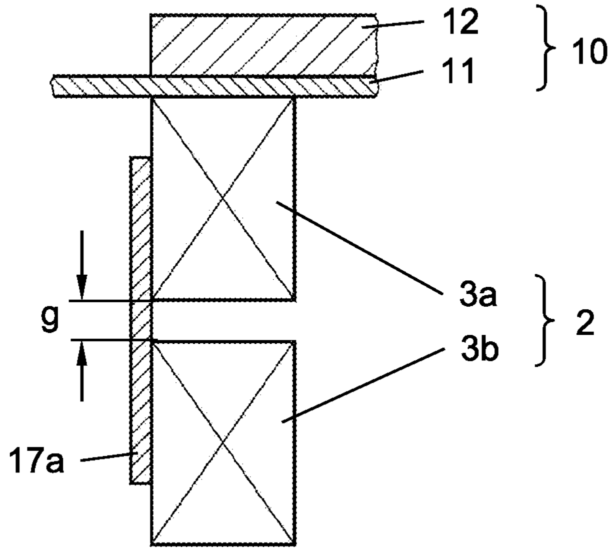
FIG. 5 is like FIG. 4 but with a second connector, which is embodied as a strip.

FIG. 5 shows a detailed sectional view of a coil arrangement 2 with a part of a membrane 10 and an alternative second connector 17*a*, which is embodied as a flexible strip in this example and which runs along the circumferences of the connected voice coils 3*a*, 3*b* and is attached thereto. Note that there is no optional second spring arm arrangement 15, too.

Figure 6:
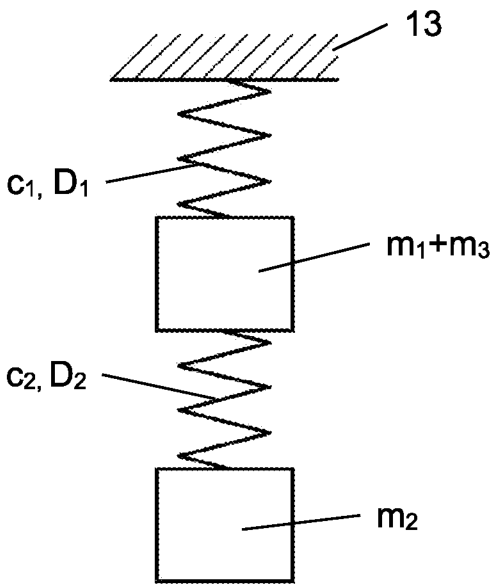
FIG. 6 shows a schematic view of the oscillating system formed by the speaker.

FIG. 6 shows a schematic view of the oscillating system, formed by a mass $m_1$ of the first voice coil 3*a* and a mass $m_3$ of the rigid membrane part or dome 12 (if there is one), a mass $m_2$ of the second voice coil 3*b*, a first compliance $c_1$ and a first damping factor $D_1$ of the first connector or membrane 10 and a second compliance $c_2$ and a second damping factor $D_2$ of the second connector 14*a*, 17*a*. As already said, the first compliance $c_1$ and a first damping factor $D_1$ is basically caused by the flexible membrane part 11 in this example. Again there is no optional second spring arm arrangement 15.

The membrane 10 (in detail its flexible membrane part 11) together with the coil arrangement 2 causes a first resonance frequency $fres_1$ for an oscillation of (inter alia) the membrane 10 in a direction parallel to the coil axis A. The second connector 14*a*, 17*a* together with the voice coils 3*a*, 3*b* of the coil arrangement 2 causes a second resonance frequency $fres_2$ for the oscillation of (inter alia) the membrane 10 in a direction parallel to the coil axis A (do also see FIGS. 8 to 11).

The first resonance frequency $fres_1$ results from a common movement of the voice coils 3*a*, 3*b*, whereas the second resonance frequency $fres_2$ results from a movement of the voice coils 3*a*, 3*b* relative to each other. The membrane oscillation in question refers to its piston movement and hence mainly to the oscillation of the rigid membrane part or dome 12.

Beneficially, the compliance $c_2$ of the second connector 14*a*, 17*a* is in a range of 10 μm/N to 100 μm/N or its stiffness or spring constant is in a range of 0.01 N/μm to 0.1 N/μm or respectively.

Figure 7:
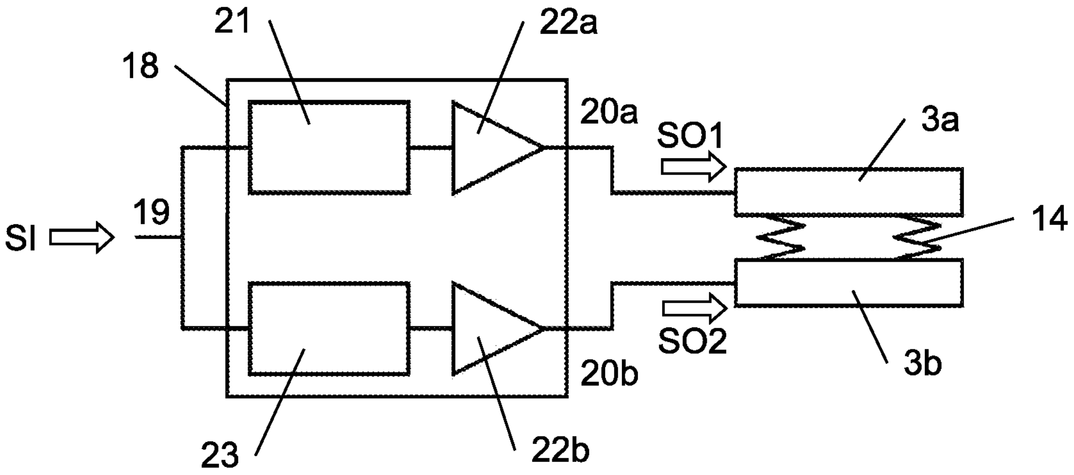
FIG. 7 shows a schematic circuit diagram of an exemplary sound signal circuit.

FIG. 7 shows an exemplary sound signal circuit 18, which comprises a sound input 19 being designed to receive a sound input signal SI and at least two sound outputs 20*a*, 20*b* each being designed to feed a coil signal SO1, SO2 to one of the voice coils 3*a*, 3*b* of the coil arrangement 2 of the speaker 1. Concretely, a first sound output 20*a* is connected to the first voice coil 3*a* and a second sound output 20*b* is connected to the second voice coil 3*b*. Accordingly, a first coil signal SO1 is fed to the first voice coil 3*a* and a second coil signal SO1 is fed to the second voice coil 3*b*. The sound signal circuit 18 and the speaker 1 together form a sound system.

The electronic sound signal circuit 18 is designed to output coil signals SO1, SO2 corresponding to the sound input signal SI in terms of their time course which are phase shifted to each other. That means that the first coil signal SO1 equals the second coil signal SO2 with regard to its shape or time course, but the first coil signal SO1 and the second coil signal SO2 are phase shifted to each other. In detail, the phase shift between the first coil signal SO1 and the second coil signal SO2 depends on the frequency of the sound input signal SI.

In this embodiment, the sound input 19 is connected to a delay circuit 21 and a downstream first amplifier 22*a* and to an electronic phase shifter 23 and a downstream second amplifier 22*b*. The phase shifter 23 provides said phase shift between the first coil signal SO1 and the second coil signal SO2, i.e. it delays the second coil signal SO2 with respect to the first coil signal SO1. For example, the phase shifter 23 can be embodied as an allpass filter, which can be realized by passive or active analog circuits as well as by digital circuits.

The delay circuit 21 provides a constant delay to take into consideration a phase independent delay of the phase shifter 23. In other words, the phase shifter 23 delays the second coil signal SO2 even at a phase shift of $\varphi=0°$. This delay is the delay provided by the delay circuit 21. The amplifiers 22*a*, 22*b* just amplify the sound input signal SI and if at all cause the same delay for the first coil signal SO1 and the second coil signal SO2. So, the amplifiers 22*a*, 22*b* have no influence on the phase shift p.

Generally, the maximum coil signals SO1, SO2 output by the electronic sound signal circuit 18 shall be smaller than coil signals SO1, SO2, which cause a body contact between the voice coils 3*a*, 3*b* of the coil arrangement 2. Otherwise the acoustic performance of the speaker 1 may be deteriorated. In particular, a distance or gap g between the adjacent voice coils 3*a*, 3*b* in their idle position can be in a range of 5 to 150 μm when measured in a direction parallel to the coil axis A. In this way, the speaker 1 is not only usable for audible sound but also for ultrasonic applications.

Figure 8:
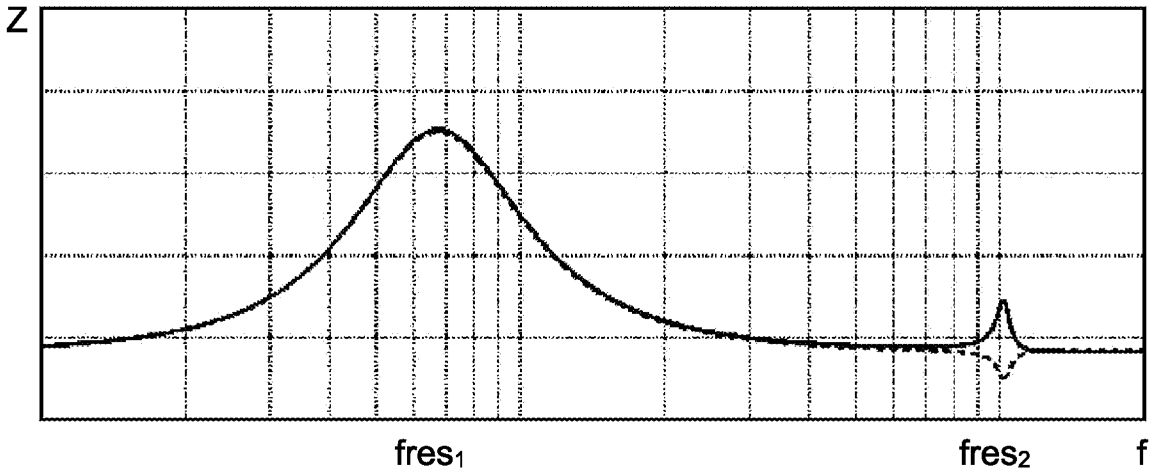
FIG. 8 shows a plot of the impedance of the speaker over the frequency.

FIG. 8 shows a diagram of the impedance Z of the coil arrangement 2 over the frequency f. The bold line shows the impedance Z of the first voice coil 3*a* and the dashed line shows the impedance Z of the second voice coil 3*b* with the first coil signal SO1 and the second coil signal SO2 being in phase (not being phase shifted). FIG. 8 clearly shows the first resonance frequency $fres_1$ for the oscillation of the membrane 10 in the excursion direction C parallel to the coil axis A which (mainly) results from the mass $m_1$ of the first voice coil 3*a*, the mass $m_2$ of the second voice coil 3*b* and the mass $m_3$ of the optional rigid membrane part or dome 12 and the first compliance $c_1$ of the first connector or membrane 10.

FIG. 8 moreover shows a second resonance frequency $fres_2$ for the oscillation of the membrane 10 in the excursion direction C parallel to the coil axis A which (mainly) results from the mass $m_1$ of the first voice coil 3*a*, the mass $m_2$ of the second voice coil 3*b* and the second compliance $c_2$ of the second connector 14*a*, 17*a*. The second resonance frequency $fres_2$ is above the first resonance frequency $fres_1$, and in particular, the second resonance frequency $fres_2$ can be below 30 kHz. In other embodiments, the second resonance frequency $fres_2$ may even be below 25 kHz or 20 kHz. Beneficially, the second resonance frequency $fres_2$ is at least three times higher than the first resonance frequency $fres_1$ and in particular at least ten times higher than the first resonance frequency $fres_1$.

Figure 9:
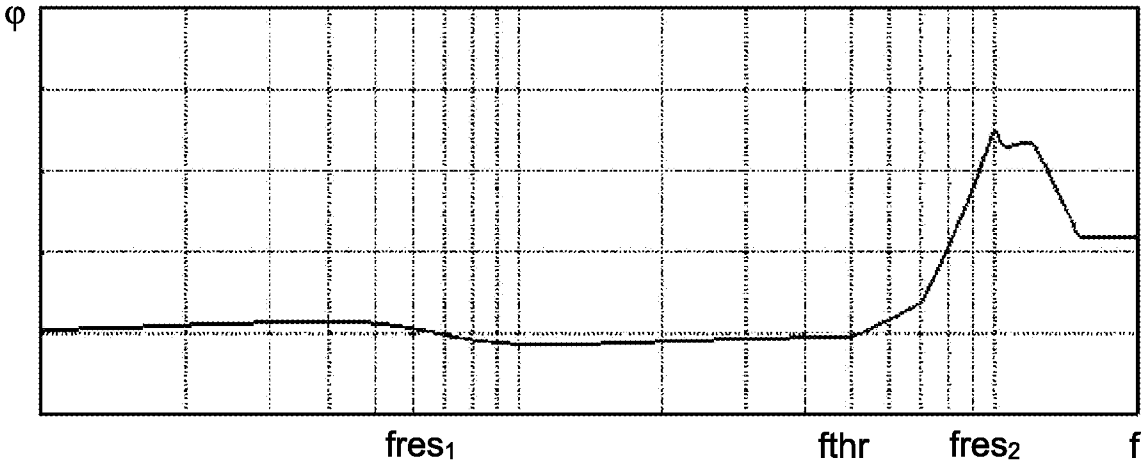
FIG. 9 shows a plot of the phase shift between the coil signals over the frequency.

FIG. 9 shows a diagram of the phase shift p over the frequency f FIG. 9 shows, that the phase shift φ over a large frequency range is zero or almost zero and then sharply rises. In particular, the phase shift φ can be <5° below a threshold frequency fthr and can rise above the threshold frequency fthr. More particularly, the threshold frequency fthr can be between the first resonance frequency $fres_1$ and the second resonance frequency $fres_2$. For example, the threshold frequency fthr can be in a range from 3 kHz to 6 kHz.

Figure 10:
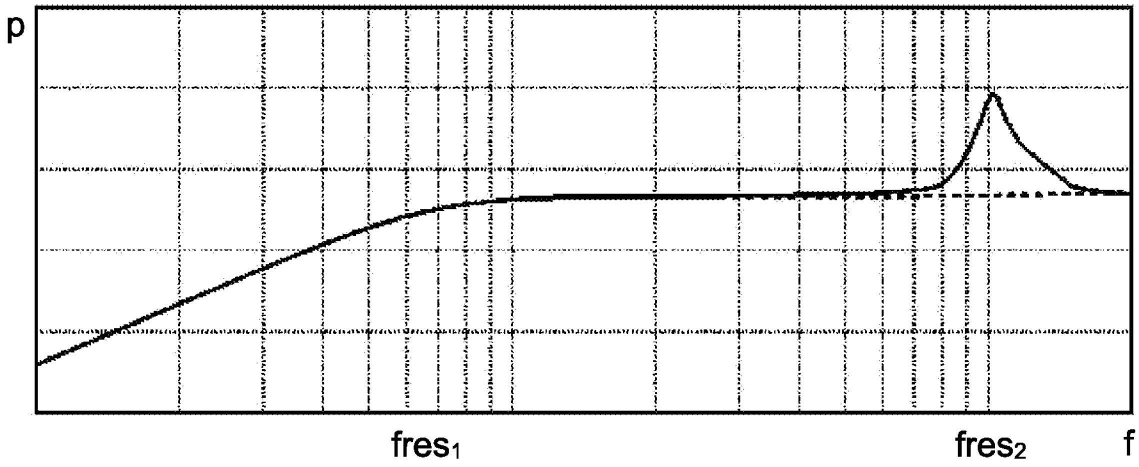
FIG. 10 shows a plot of the sound pressure level of the speaker over the frequency.

FIG. 10 shows a diagram of the sound pressure level p of the speaker 1 over the frequency f Again, the second resonance frequency $fres_2$ is clearly visible.

Figure 11:
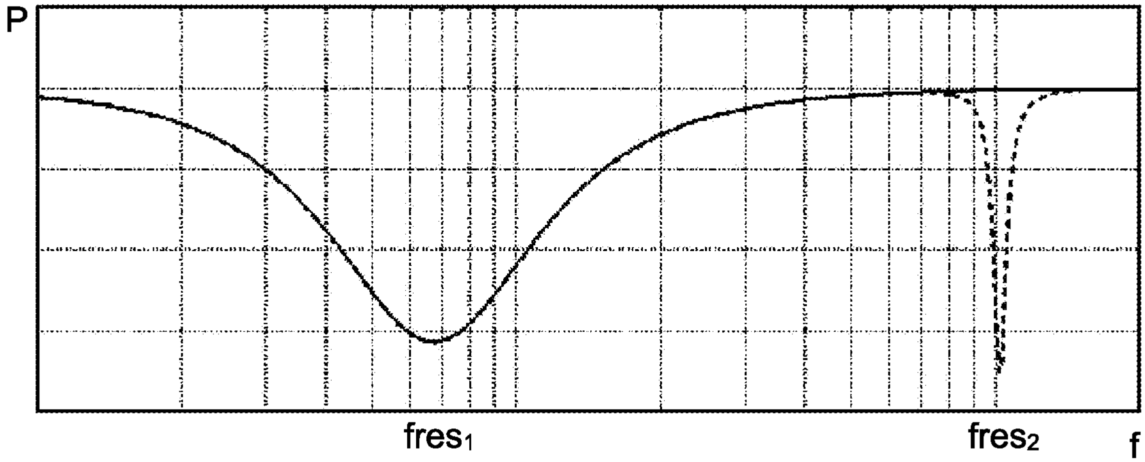
FIG. 11 shows a plot of the power consumption of the speaker over the frequency.

Finally, FIG. 11 shows a diagram of the power P of the speaker 1 over the frequency f. The dashed line shows the course with a phase shift φ, the bold line without phase shift φ. One can easily see that the power consumption sharply drops in the region of the first resonance frequency $fres_1$ and the second resonance frequency $fres_2$.

Figure 12:
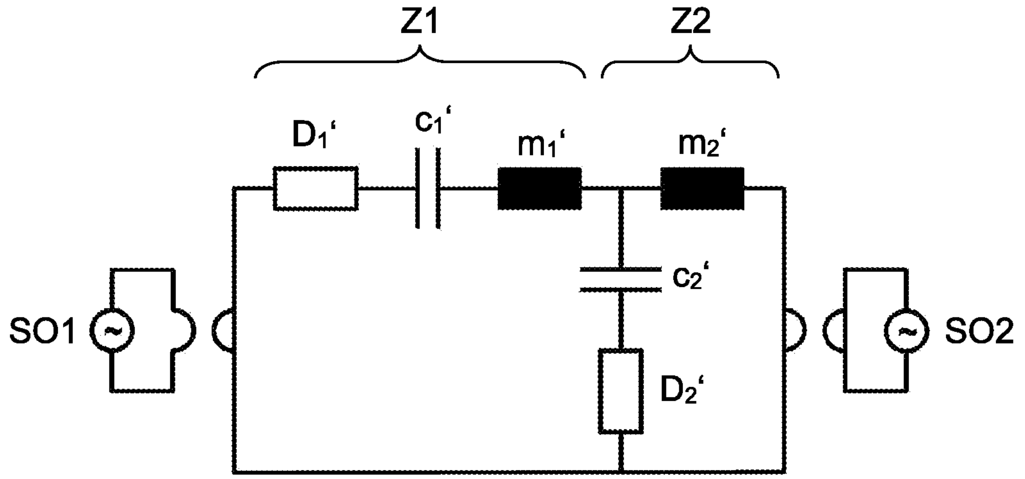
FIG. 12 shows an equivalent circuit for the oscillating system.

FIG. 12 shows an electric circuit which is equivalent to the oscillating system depicted in FIG. 6. Concretely, the first coil $m_1'$ corresponds to the first mass $m_1$, the second coil $m_2'$ corresponds to the second mass $m_2$, the first capacitance $c_1'$ corresponds to the first compliance $c_1$, the second capacitance $c_2'$ corresponds to the second compliance $c_2$, the first resistor $D_1'$ corresponds to a damping of the first connector or membrane 10 and the second resistor $D_2'$ corresponds to a damping of the second connector 14*a*, 17*a*. Additionally, FIG. 12 by use of two gyrators symbolically shows where the first coil signal SO1 and the second coil signal SO2 are fed into the system. It should be noted at this point that the electric equivalent circuit is based on a force-voltage-analogy what means that a force in the oscillating system depicted in FIG. 6 corresponds to a voltage in the electric circuit of FIG. 12.

The impedances Z1 and Z2 and the total impedance Z can be calculated as follows:

$$Z1 = D_1' + \frac{1}{j\omega c_1'} + j\omega m_1'$$

$$Z2 = \frac{1}{\frac{1}{j\omega m_2'} + \frac{1}{D_2' + \frac{1}{j\omega c_2'}}}$$

$$Z = \frac{1}{\frac{1}{Z1} + \frac{1}{Z2}}$$

Accordingly, the first resonance frequency $fres_1$ and the second resonance frequency $fres_2$ can be approximately calculated as follows:

$$fres_1 = \frac{1}{2\pi}\sqrt{\frac{1}{c_1 \cdot (m_1 + m_2 + m_3)}}$$

$$fres_2 = \frac{1}{2\pi}\sqrt{\frac{1}{c_{par} \cdot m_{par}}}$$

wherein $c_{par}$ is the resulting compliance from a parallel circuit of $c_1$ and $c_2$ and wherein $m_{par}$ is the resulting mass from a parallel circuit of $m_1$, $m_2$ and $m_3$:

$$c_{par} = \frac{c_1 \cdot c_2}{c_1 + c_2}$$

$$m_{par} = \frac{(m_1 + m_3) \cdot m_2}{m_1 + m_2 + m_3}$$

Based on the equivalent circuit of FIG. 12 the following favorable conditions can be derived:

Beneficially, a variable $K_1$ in the equation $$K_1 = c_1 \cdot (m_1 + m_2 + m_3)$$

is in a range of $1.0 \cdot 10^{-8}$ (corresponding to a first resonance frequency $fres_1$=1.6 kHz) to $6.5 \cdot 10^{-7}$ (corresponding to $fres_1$=200 Hz), in particular in a range of $2.5 \cdot 10^{-8}$ (corresponding to $fres_1$=1 kHz) to $1.5 \cdot 10^{-7}$ (corresponding to $fres_1$=410 Hz), wherein $c_1$ is the first compliance of the first connector or membrane 10, $m_1$ is the mass of the first voice coil 3*a*, $m_2$ is the mass of the second voice coil 3*b* and $m_3$ is the mass of the optional rigid membrane part or dome 12.

Further on, it is beneficial if a variable $K_2$ in the equation $$K_2 = \frac{c_1 \cdot c_2}{c_1 + c_2} \cdot \frac{(m_1 + m_3) \cdot m_2}{m_1 + m_2 + m_3}$$

is in a range of $1.0 \cdot 10^{-10}$ (corresponding to a second resonance frequency $fres_2$=16 kHz) to $4.0 \cdot 10^{-10}$ (corresponding to $fres_2$=8 kHz), in particular in a range of $2.0 \cdot 10^{-10}$ (corresponding to $fres_2$=11.2 kHz) to $3.0 \cdot 10^{-10}$ (corresponding to $fres_2$=9.2 kHz), wherein $c_2$ is the second compliance of the second connector 14*a*, 17*a*.

A quality factor of the second resonance frequency $fres_2$ caused by the second connector 14*a*, 17*a* in particular by the damping of the second connector 14*a*, 17*a* or second resistor $D_2'$ respectively beneficially can be in a range of 1 to 20.

When designing a sound system, in particular the following steps can be taken:

- Define the gap g between the voice coils 3*a*, 3*b* (e.g. 100 μm);
- Derive the second resonance frequency $fres_2$ where the actual distance between the voice coils 3*a*, 3*b* does not exceed the given gap g. In other words, where the voice coils 3*a*, 3*b* do not touch each other; and
- Perform a measurement of the sound pressure level p (or a with parameter depending on the sound pressure level p) and vary the phase shift φ at the same time and find a maximum of the sound pressure level p.

Figure 13:
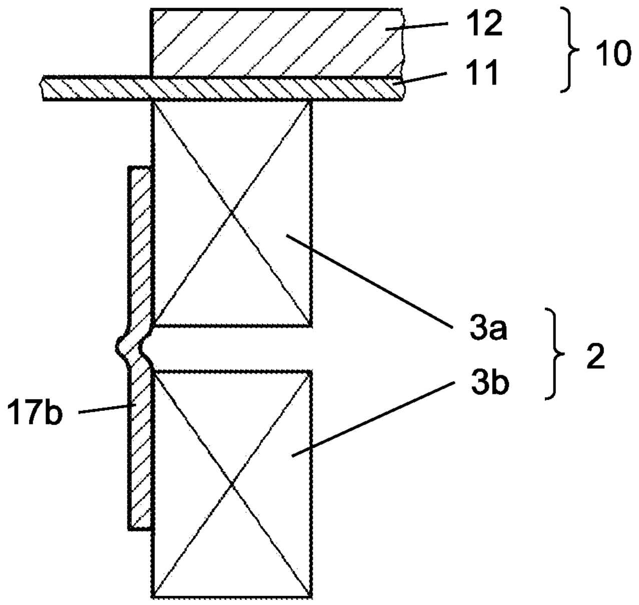
FIG. 13 shows a detailed sectional view of a coil arrangement with a part of a membrane and a second connector embodied as a corrugated strip.

FIG. 13 now shows an arrangement, which is similar to that of FIG. 5. In contrast, the strip 17*b* comprises a corrugation, which runs along the gap g between the voice coils 3*a*, 3*b* in this example. By these measures, similar characteristics can be obtained both for tension (i.e. when the voice coils 3*a*, 3*b* move away from each other) and compression (i.e. when the voice coils 3*a*, 3*b* move towards each other).

Figure 14:
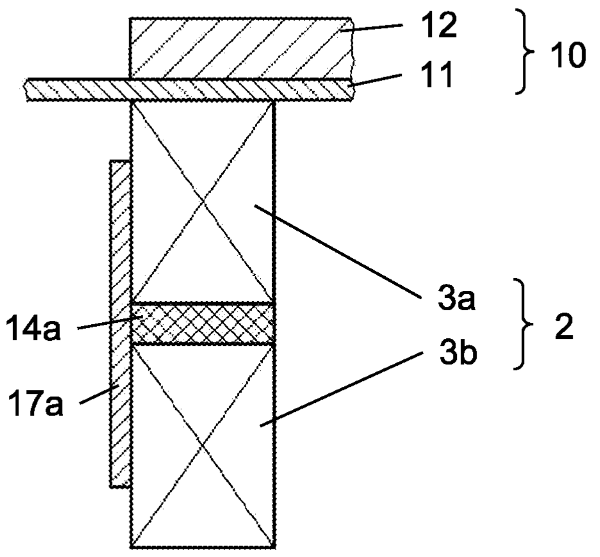
FIG. 14 is like FIG. 5 but with an additional glue layer between the voice coils.

FIG. 14 shows an arrangement, which basically is a combination of the arrangements of FIGS. 4 and 5 and which both comprises a glue layer 14 and a strip 17*a*. So, the second connector comprises a plurality of sub parts and moreover a plurality of different types of sub parts.

Figure 15:
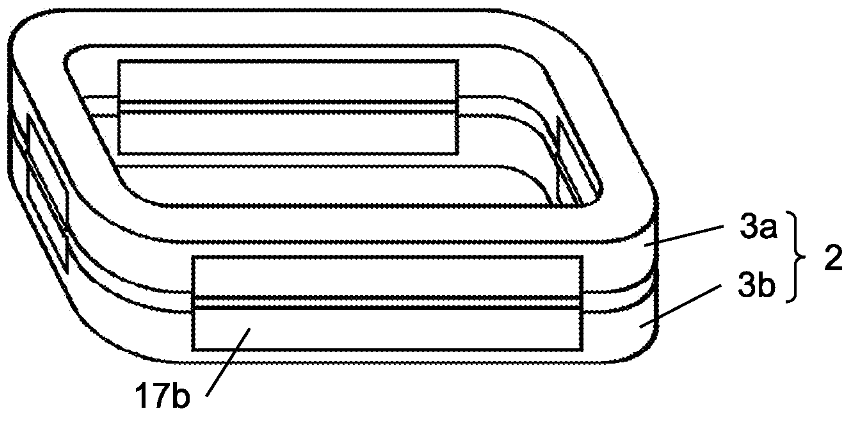
FIG. 15 shows an oblique view of a coil arrangement with a second connector embodied as a corrugated strips on the longitudinal sides of the voice coils.

FIG. 15 shows an oblique view of a coil arrangement 2, whose voice coils 3*a*, 3*b* are interconnected by a plurality of strips 17*b* of the type disclosed in FIG. 13. So, the second connector comprises a plurality of sub parts in this embodiment, which each is embodied as a strip 17*b* connecting the voice coils 3*a*, 3*b* and which runs along the inner circumferences or outer circumferences of the connected voice coils 3*a*, 3*b* and is attached thereto. In the example of FIG. 15, there is no glue layer 14*a* between the voice coils 3*a*, 3*b*. However, there may also be such a glue layer 14*a* like this is depicted in FIG. 14.

Figure 16:
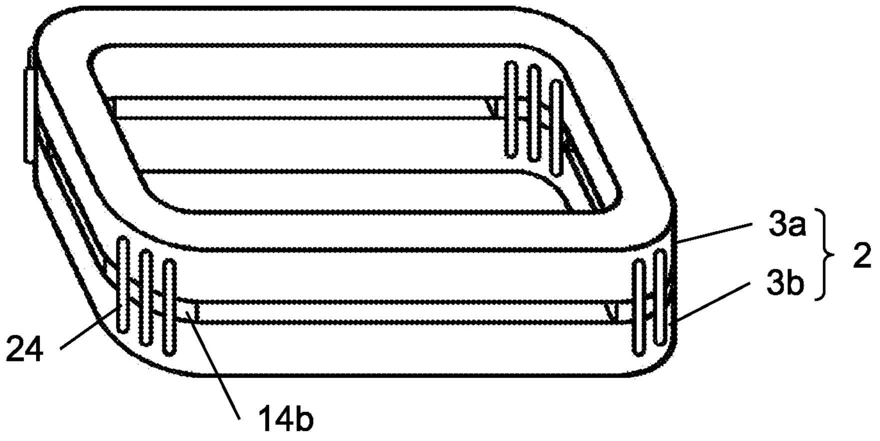
FIG. 16 shows an oblique view of a coil arrangement with glue pads and glue beads in the corners of the voice coils.

FIG. 16 shows an alternative embodiment, where the voice coils 3*a*, 3*b* of the coil arrangement 2 are connected at their inner circumferences and outer circumferences by means glue beads 24, which each runs in a direction parallel to the coil axis A in this embodiment. In addition, glue pads 14*b* are arranged between the voice coils 3*a*, 3*b* in their corners. So, again the second connector comprises a plurality of sub parts and moreover a plurality of different types of sub parts.

Figure 17:
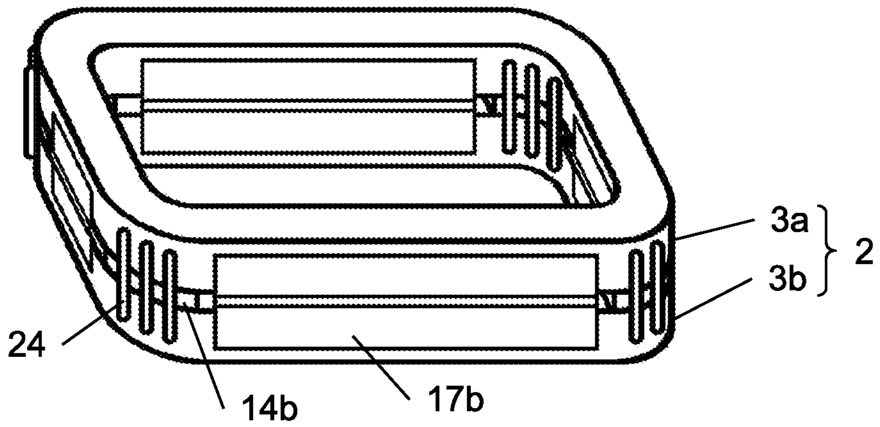
FIG. 17 is like FIG. 16 but with additional corrugated strips on the longitudinal sides of the voice coils.

FIG. 17 shows an arrangement, which basically is a combination of the arrangements of FIGS. 15 and 16. In addition to the arrangement of FIG. 16, the arrangement of FIG. 17 comprises a plurality of strips 17*b* connecting the voice coils 3*a*, 3*b*. So, the variety of the sub parts of the second connector is even greater.

Figure 18:
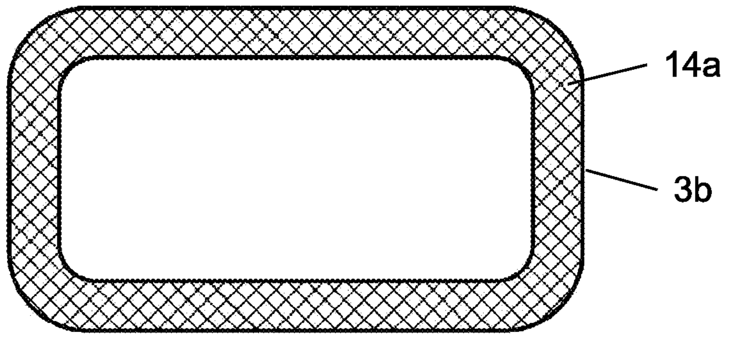
FIG. 18 a top view on a voice coil with a glue layer fully covering a connection surface of the voice coil.

FIG. 18 shows a top view on the second voice coil 3*b*, which is fully covered by a glue layer 14*a*. During production, the first voice coil 3*a* is put on top of the glue layer 14*a* to interconnect the voice coils 3*a*, 3*b*. So, the second connector is embodied as or comprises a glue layer 14*a* between the voice coils 3*a*, 3*b* in this embodiment. The glue layer fully 14*a* covers connection areas of the voice coils 3*a*, 3*b*, which connection areas face each other and are oriented perpendicular to the coil axis A.

Figure 19:
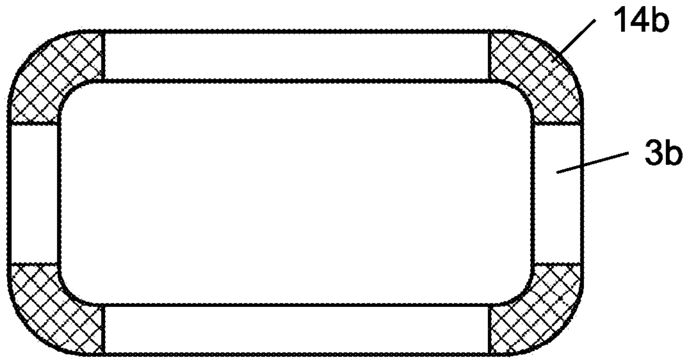
FIG. 19 shows a top view on a voice coil with glue pads on a connection surface of the voice coil.

FIG. 19 is similar to FIG. 18, but in contrast there are glue pads 14*b* just in the corners of the second voice coil 3*b*. Generally, the second connector comprises a plurality of sub parts, which each is embodied as or comprises a glue pad 14*b* connecting the voice coils 3*a*, 3*b* in this embodiment. The glue pads 14*b* partly cover connection areas of the voice coils 3*a*, 3*b*, which connection areas face each other and are oriented perpendicular to the coil axis A.

Figure 20:
FIG. 20 shows a top view on a coil arrangement with a connecting strip on the outer circumference of the voice coils.
Figure 21:
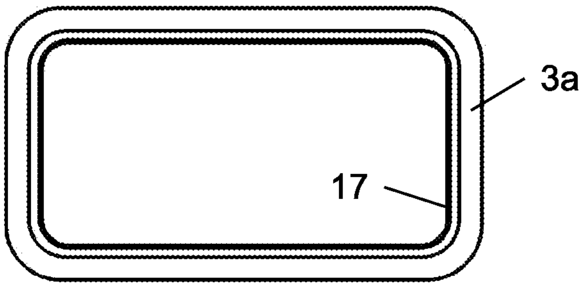
FIG. 21 is like FIG. 20 but with a connecting strip on the inner circumference of the voice coils.
Figure 22:
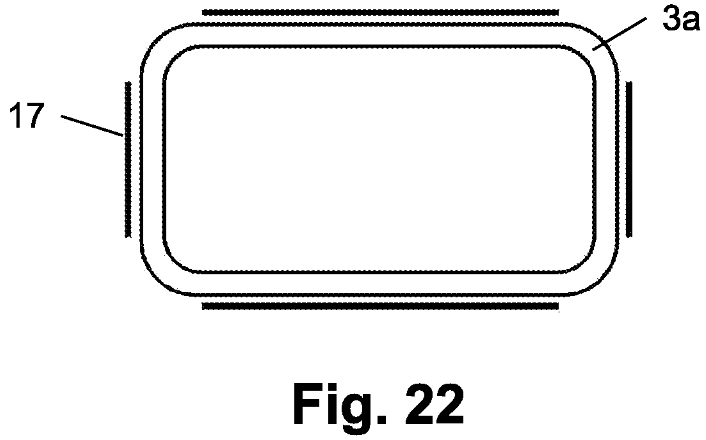
FIG. 22 shows a top view on a coil arrangement with connecting strips on the outer longitudinal sides of the voice coils.
Figure 23:
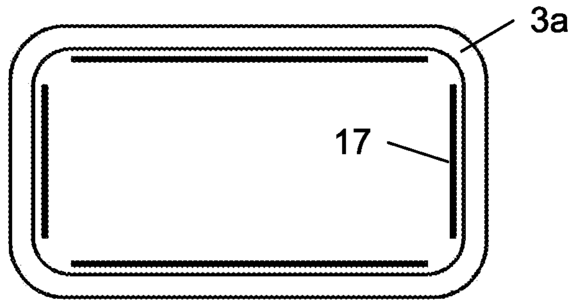
FIG. 23 is like FIG. 22 but with connecting strips on the inner longitudinal sides of the voice coils.
Figure 24:
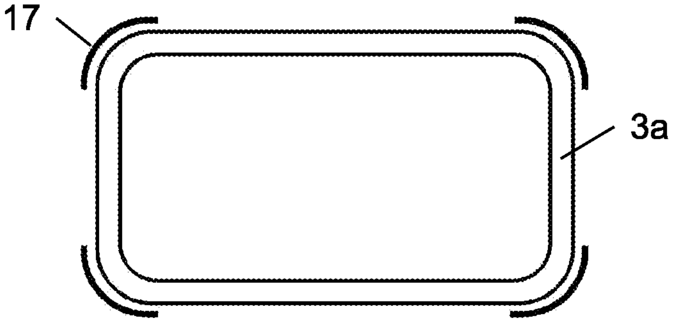
FIG. 24 shows a top view on a coil arrangement with connecting strips at the corners of the voice coils.
Figure 25:
FIG. 25 is like FIG. 24 but with additional connecting strips on the inner longitudinal sides of the voice coils.
Figure 26:
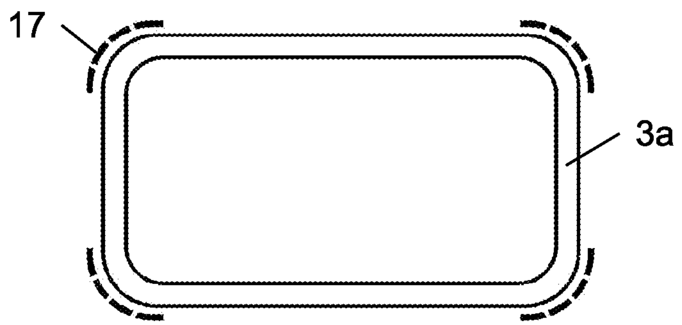
FIG. 26 shows a top view on a coil arrangement with a plurality of connecting strips in each corner of the voice coils.

FIGS. 20 to 26 show top views of different arrangements with a strip 17 or with strips 17 connecting the voice coils 3*a*, 3*b*. FIG. 20 shows an arrangement where the strip 17 is located on the outer circumference of the voice coils 3*a*, 3*b* and where the strip 17 runs along the whole circumference. FIG. 21 is very similar to FIG. 20, but in contrast the strip is arranged on the inner circumference of the voice coils 3*a*, 3*b*. FIG. 22 shows an embodiment, where a plurality of strips 17 are arranged on the outer longitudinal sides of the polygonal voice coils 3*a*, 3*b*. FIG. 23 is quite similar to FIG. 22, but in contrast the strips 17 are arranged on the inner longitudinal sides of the polygonal voice coils 3*a*, 3*b*. FIG. 24 shows an arrangement, where the a plurality of strips 17 is arranged on the outer corners of the polygonal voice coils 3*a*, 3*b*. FIG. 25 is a mixed embodiment combining the features of FIGS. 23 and 24. FIG. 26 finally shows an embodiment, which is similar to that of FIG. 24. In contrast, a plurality of smaller strips 17 is arranged on each outer corner of the polygonal voice coils 3*a*, 3*b*.

It should be noted that although the above description refers to strips 17, the technical disclosure equally applies to glue beads 24. That means that one or more glue beads 24 can be provided instead of a strip 17 in the arrangements of FIGS. 20 to 26. For example, glue beads 24 can be arranged on the inner longitudinal sides of the polygonal voice coils 3*a*, 3*b* instead of the strips 17.

Mixed embodiments of strips 17 and glue beads 24 are possible as well. In addition, a glue layer 14*s* or glue pads 14*b* can be provided. It should also be noted that glue pads 14*b* can also be provided on the longitudinal sides of the polygonal voice coils 3*a*, 3*b* (not only in the corners).

Figure 27:
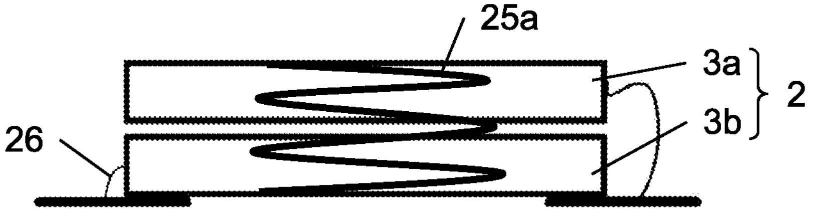
FIG. 27 shows a side view on a coil arrangement with a second connector embodied as first meander-like spring arms.

FIG. 27 shows an arrangement with two voice coils 3*a*, 3*b* and meander-like first spring arms 25*a*, which connect the voice coils 3*a*, 3*b* of the coil arrangement 2. The first spring arms 25*a* are sub parts of the second connector and together form a first spring arrangement. In addition, the arrangement of FIG. 27 comprises a plurality of wires 26 electrically connecting the voice coils 3*a*, 3*b* of the coil arrangement 2 to an electronic sound signal circuit 18 like one is depicted in FIG. 7, concretely to its sound outputs 20*a*, 20*b*. Commonly, such wires 26 are made in a way that they do not much influence the performance of the speaker 1. However, they add stiffness and damping to the system, and as such the wires 26 may also be considered as sub parts of the second connector.

Figure 28:
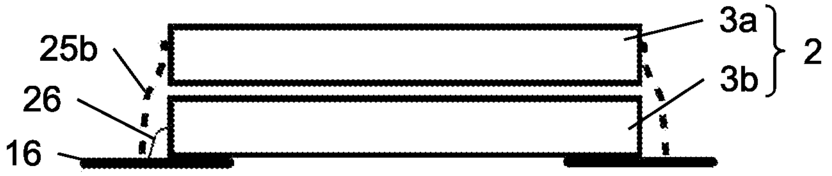
FIG. 28 shows a side view on a coil arrangement with first spring arms in the corners of the voice coils.
Figure 29:
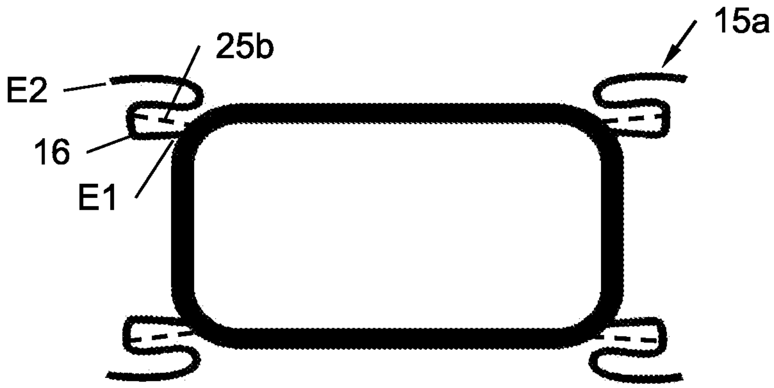
FIG. 29 shows a top view on the arrangement of FIG. 28.

FIGS. 28 and 29 show another arrangement with two voice coils 3*a*, 3*b* with different first spring arms 25*b*, which couple the voice coils 3*a*, 3*b* of the coil arrangement 2. Again, the first spring arms 25*b* are sub parts of the second connector and together form a first spring arrangement. FIG. 28 shows a side view of the arrangement and FIG. 29 a top view.

Moreover, the arrangement of FIGS. 28 and 29 comprises a second spring arm arrangement 15*a* of second spring arms 16 each having a first end E1 and a second end E2. Each of the second spring arms 16 at its first end E1 connects to the second voice coil 3*b*, at its second end E2 connects to the frame 13 and at a connecting point displaced from both end points E1, E2 connects to a first spring arm 25*b* of the first spring arrangement. So, the voice coils 3*a*, 3*b* may move in relation to the frame 13 but also in relation to each other.

Figure 30:
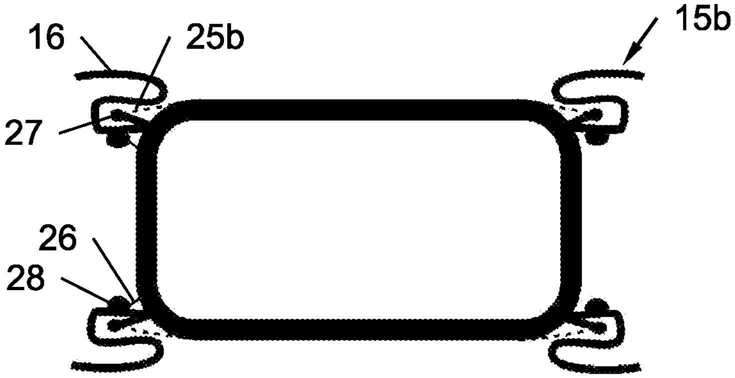
FIG. 30 shows a top view on a coil arrangement with first spring arms connecting to protrusions of a second spring arrangement.

FIG. 30 shows a top view of an arrangement, which is similar to the arrangement shown in FIGS. 28 and 29. In contrast, the first spring arm 25*b* connects to a separate protrusion 27 of the second spring arm arrangement 15*b*. So, contrary to the embodiment of FIGS. 28 and 29 the first spring arrangement is decoupled from the second spring arm arrangement 15*b* of second spring arms 16. FIG. 30 moreover explicitly depicts contacting pads 28 for the wires 26.

Generally, the second spring arms 16 can be seen as a third connector between the coil arrangement 2 and the common frame 13, which increases the first resonance frequency $fres_1$ without further measures. To keep the first resonance frequency $fres_1$ low, the first connector or membrane 10 can be made softer in accordance with the stiffness added by the third connector. Similar considerations apply if the speaker 1 has a back volume F (see FIG. 2), which increases the first resonance frequency $fres_1$ without further measures, too. Hence, to keep the first resonance frequency $fres_1$ low, the first connector or membrane 10 and/or third connector can be made softer in accordance with the stiffness added by the back volume F.

To "connect" the voice coils 3*a*, 3*b* in the context of the first spring arms 25*a*, 25*b* means that the voice coils 3*a*, 3*b* are directly interconnected like this is the case in the example shown in FIG. 27. To "couple" the voice coils 3*a*, 3*b* in the context of the first spring arms 25*a*, 25*b* means that the voice coils 3*a*, 3*b* are indirectly interconnected like this is the case in the examples shown in FIGS. 28 to 31.

Generally, the first spring arm 25*a*, 25*b* and/or second spring arms 16 can be made of or comprise a metal. "Metals"

in the given context in particular can be aluminum and its alloys, copper, and its alloys and stainless steel.

The second spring arms 16 are meander-like with two bows each. However, the second spring arms 16 can look differently. For example, the second spring arms 16 may have a different number of bows and may be formed by straight concatenated segments, too. Similar considerations apply to the first spring arms 25*a* of FIG. 27.

It should be noted that the wires 26 bridge just a small distance between the voice coils 3*a*, 3*b* and the first ends E1 of the second spring arms 16. So, the second spring arms 16 electrically connect the wires 26 and the two sound outputs 20*a*, 20*b* of the sound signal circuit 18 (see FIG. 7). Accordingly, the second spring arms 16 have both a mechanical function and an electrical function in this embodiment, and strictly speaking an electrical connection between sound outputs 20*a*, 20*b* and the voice coils 3*a*, 3*b* is made by the second spring arms 16 and the wires 26. However, in an alternative embodiment, the wires 26 can also directly connect the sound outputs 20*a*, 20*b* and the voice coils 3*a*, 3*b*. In that case, the wires 26 are longer and are lead to the frame 13.

Figure 31:
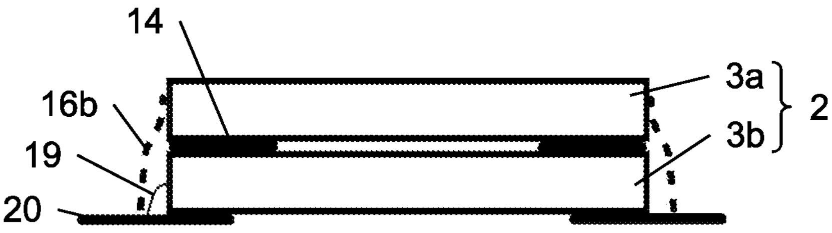
FIG. 31 is like FIG. 28 but with glue pads between the voice coils.

FIG. 31 shows an arrangement, which is similar to the ones shown in FIGS. 28 to 30. In contrast, the arrangement of FIG. 31 comprises glue pads 14*b* between the voice coils 3*a*, 3*b*.

Reference is now made to the sound signal circuit 18 again. In one embodiment, the at least two sound outputs 20*a*, 20*b* (see FIG. 7) each can be formed by two wires 26 per voice coil 3*a*, 3*b*. In other words, the sound signal circuit 18 of FIG. 7 is shown there just on a signal level, but electrically there are two connecting wires 26 per voice coil 3*a*, 3*b*. In detail, the first amplifier 22*a* can be connected to the first voice coil 3*a* by means of two wires 26, and the second amplifier 22*b* can be connected to the second voice coil 3*b* by means of further two wires 26.

Figure 32:
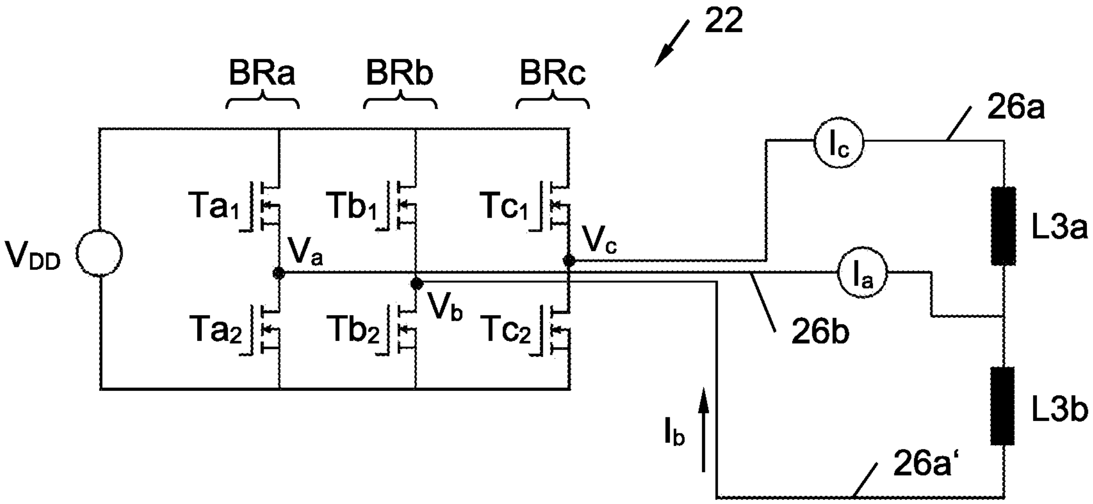
FIG. 32 shows a schematic circuit diagram of an exemplary amplifier with a 3-wire interface and FIG. 33 shows a plot of the sound pressure level of the speaker over the frequency in case of voice coils with different mass.

However, this is not the only possibility. FIG. 32 shows an embodiment of an amplifier 22 of a sound signal circuit 18 where the at least two sound outputs 20*a*, 20*b* each are formed by a first single wire 26*a*, 26*a*' per voice coil 3*a*, 3*b* and a second common wire 26*b*, which is shared between two voice coils 3*a*, 3*b*. In detail, the amplifier 22 here has three half bridges BRa . . . BRc, which each comprises two serial transistors $Ta_1$ . . . $Tc_2$ and which are powered by the source voltage VDD. The outputs of the half bridges BRa . . . BRc are connected to the voice coils 3*a*, 3*b* by use of the first single wires 26*a*, 26*a*' and the second common wire 26*b*. It should be noted at this point that the voice coils 3*a*, 3*b* are represented by the inductances L3*a*, L3*b* in FIG. 32.

By connecting or coupling the phase shifter 23 and the delay circuit 21 to the control inputs of the transistors $Ta_1$ . . . $Tc_2$, the coil signals SO1, SO2 can be generated. Controlling the output power of the amplifier 22 and in turn overload protection of the amplifier 22 can be done by measuring the currents Ia and Ic and the voltages Va . . . Vc. The third current Ib can be measured, too, or can be calculated by the formula Ib=Ic−Ia.

Note that in the above disclosure just the wires 26, 26*a*, 26*b* have been taken into consideration to connect the sound outputs 20*a*, 20*b* and the voice coils 3*a*, 3*b*. However, as noted hereinbefore, the second spring arms 16 can have an electrical function, too, as the case may be.

It should also be noted that load or current Ia carried by the first half bridge BRa may reach twice the load or current Ib, Ic carried by the second and third half bridge BRb, BRc. Accordingly, the first half bridge BRa can be made with transistors $Ta_1$, $Ta_2$ which allow for a higher current than the transistors $Tb_1$ . . . $Tc_2$ of the second and third half bridge BRb, BRc. It is also possible to use the same transistors $Ta_1$ . . . $Tc_2$ for the half bridges BRa . . . BRc and to double the first half bridge BRa. That means that there are two parallel first half bridges BRa then. In that, production of the amplifier 22 can be eased. One another possibility for using the same transistors $Ta_1$ . . . $Tc_2$ is to overdimension the transistors $Tb_1$ . . . $Tc_2$ of the second and third half bridge BRb, BRc.

Generally, the second connector 14, 17, 17*a*, 17*b*, 24, 25*a*, 25*b* and its sub parts may have different second compliances $c_2$ and different second damping factors $D_2$. In this way, the vibration characteristics can be influenced widely. Although compliance and damping appear as a pair in real materials, the second connector 14, 17, 17*a*, 17*b*, 24, 25*a*, 25*b* and its sub parts can be more on the spring side or more on the damping side.

Beneficially, a glue layer 14*a* or glue pads 14*b* can be made of plastics having a Shore hardness from 00-5 to A-20 and/or an elongation at tear of more than 100%. Accordingly, the glue layer 14*a* or glue pads 14*b* are very soft and do not have a considerable spring constant. The reason is that the glue layer 14*a* or the glue pads 14*b* because of their comparably large active area have a comparably great influence on the vibration characteristics.

Glue beads 24 beneficially are made of plastics having a Shore hardness from A-20 to D-50 and/or an elongation at tear of more than 200%. Accordingly, the glue beads 24 have a considerable spring constant.

The same counts for strips 17*a*, 17*b*, which are beneficially made of or comprise a thermoplastic elastomer with a Young's Modulus of 2 MPa to 2 Gpa or a thermoplastic with a Young's Modulus of 100 MPa to 12 Gpa and thus mainly act as a spring. Preferably, the thickness of a strip 17*a*, 17*b* is in a range of 5 μm to 50 μm. in particular in a range of 5 μm to 20 μm.

Similarly, the first spring arms 25*a*, 25*b*, mainly act as a spring as well.

In a very advantageous embodiment of the speaker 1, the glue layer 14*a* or the glue pads 14*b* reach to the inner circumferences of the voice coils 3*a*, 3*b* at each of the glue beads 24 arranged on said inner circumferences, and reach to the outer circumferences of the voice coils 3*a*, 3*b* at each of the glue beads 24 arranged on said outer circumferences.

In this context, it is very advantageous if a method of manufacturing a coil arrangement 2, comprises the following steps:

- providing at least two voice coils 3*a*, 3*b*,
- applying a glue layer 14*a* or glue pads 14*b* on at least one of the voice coils 3*a*, 3*b*,
- arranging the voice coils 3*a*, 3*b* over one another in a direction parallel to the coil axis A,
- connecting the voice coils 3*a*, 3*b* by gluing them together by use of the glue layer 14*a* or glue pads 14*b*,
- moving the voice coils 3*a*, 3*b* to each other until a desired gap g between the same is obtained, wherein the glue layer 14*a* or glue pads 14*b* reach(es) to the inner circumferences of the voice coils 3*a*, 3*b* at each position of a desired glue bead 24 arranged on the inner circumferences of the voice coils 3*a*, 3*b* and to the outer circumferences of the voice coils 3*a*, 3*b* at each position of a desired glue bead 24 arranged on the outer circumferences of the voice coils 3*a*, 3*b*, and
- additionally connecting the voice coils 3*a*, 3*b* by applying glue beads 24 to the voice coils 3*a*, 3*b* at the aforementioned positions.

By the above measures, the risk that the comparably hard glue beads 24 reach into the gap g between the voice coils 3*a*, 3*b* and hinder or even block a relative movement between the same is avoided. Instead, the glue layer 14*a* or glue pads 14*b* fill the gap g where the glue beads 4 are later applied.

An additional possibility to influence the vibration characteristics of the oscillating system is variation of the mass $m_1$, $m_2$ of the voice coils 3*a*, 3*b* and the mass $m_3$ of the rigid membrane part or dome 12. In the above examples, the voice coils 3*a*, 3*b* were considered to be identical and thus were considered to have identical masses $m_1$, $m_2$. However, this is no mandatory condition and the voice coils 3*a*, 3*b* can also be designed differently. In particular, the voice coils 3*a*, 3*b* may be made of different materials, may have different numbers of windings, may have different height and/or may have different masses $m_1$, $m_2$.

Figure 33:
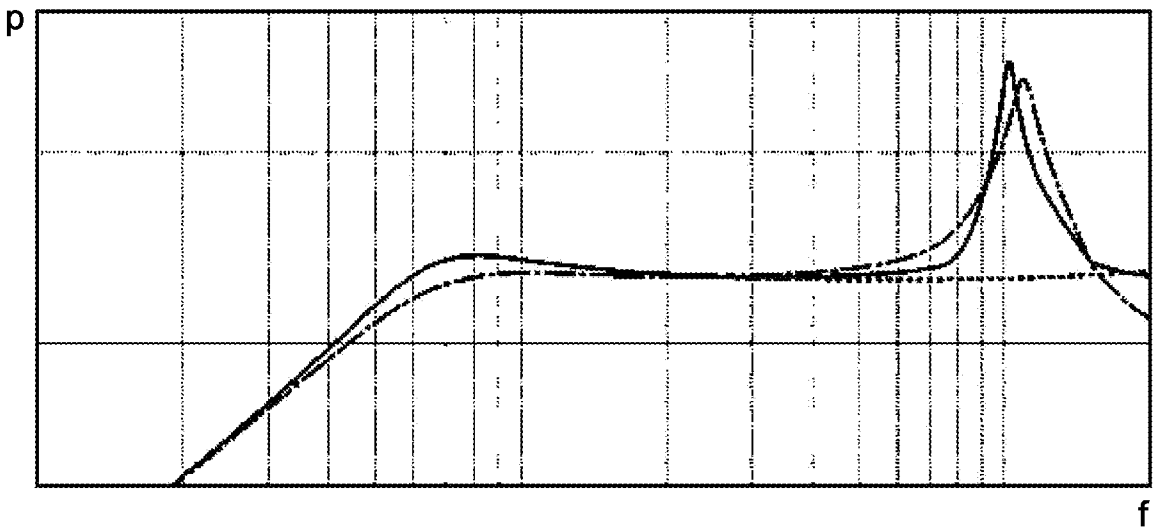

FIG. 33 in this context shows a plot of the sound pressure level p over the frequency f for equal voice coils 3*a*, 3*b* (solid line, equal mass, equal number of windings) and for a very heavy second voice coil 3*b* (dash dotted, 90% of total mass and 90% of total windings) with a light first voice coil 3*a* (10% of total mass, 10% of total windings). The dotted line finally shows the sound pressure level p of a reference speaker without a second resonance frequency $fres_2$.

In the above disclosure, a two-mass spring system based on a coil arrangement 2, comprising a first voice coil 3*a*, which is mounted to the membrane 10, and a second voice coil 3*b*, which is connected to the first voice coil 3*a* by the second connector 14, 17, 17*a*, 17*b*, 24, 25*a*, 25*b* is described. However, the above considerations also apply to more complex systems with more than two voice coils 3*a*, 3*b* oscillating to each other. Such a system then has more than a second resonance frequency $fres_2$. Accordingly, the frequency response of a speaker 1 can be influenced even more then.

The technical disclosure in particular applies to small speakers 1 with a membrane 10, which has an area of less than 600 $mm^2$ when viewed in a direction parallel to the coil axis A and/or speakers 1 with a back volume F, which is in a range from 200 $mm^3$ to 2 $cm^3$. The back volume F generally is the volume "behind" the membrane 10 and may be the volume enclosed by a housing of the speaker 1.

It should be noted that the invention is not limited to the above-mentioned embodiments and exemplary working examples. Further developments, modifications and combinations are also within the scope of the patent claims and are placed in the possession of the person skilled in the art from the above disclosure. Accordingly, the techniques and structures described and illustrated herein should be understood to be illustrative and exemplary, and not limiting upon the scope of the present invention. The scope of the present invention is defined by the appended claims, including known equivalents and unforeseeable equivalents at the time of filing of this application. Although numerous embodiments of this invention have been described above with a certain degree of particularity, those skilled in the art could make numerous alterations to the disclosed embodiments without departing from the spirit or scope of this disclosure.

It should also be noted that the FIGS. are not necessarily drawn to scale and the depicted parts may be larger or smaller in reality.

LIST OF REFERENCES

1 speaker
2 coil arrangement
3*a*, 3*b* voice coil
4 magnet system
5 center magnet
6 outer magnet
7 center top plate
8 outer top plate
9 bottom plate
10 membrane/first connector
11 flexible membrane part
12 rigid membrane part
13 frame
14*a*, 14*b* glue layer (embodiment of second connector)
15 second spring arm arrangement
16 second spring arm
17, 17*a*, 17*b* strip (embodiment of second connector)
18 sound signal circuit
19 sound input
20*a*, 20*b* sound output
21 delay circuit
22, 22*a*, 22*b* amplifier
23 electronic phase shifter
24 glue bead (embodiment of second connector)
25*a*, 25*b* first spring arm (embodiment of second connector)
26, 26*a* . . . 26*b* wire
27 protrusion
28 contacting pad
A coil axis
B magnetic field
C excursion direction
E1, E2 end of second spring arm
F back volume
g gap
$c_1$ first compliance of first connector or membrane
$c_2$ second compliance of second connector
$D_1$ first damping factor of first connector or membrane
$D_2$ second damping factor of second connector
$m_1$ mass of first voice coil
$m_2$ mass of second voice coil
$m_3$ mass of rigid membrane part or dome
$c_1'$ first capacitance
$c_2'$ second capacitance
$D_1'$ first resistor
$D_2'$ second resistor
$m_1'$ first coil
$m_2'$ second coil
f frequency
$fres_1$ first resonance frequency
$fres_2$ second resonance frequency
fthr threshold frequency

What is claimed is:

1. A speaker, comprising:

a coil arrangement with at least two voice coils, wherein each of the voice coils has an electrical conductor in the shape of loops running around a coil axis in a loop section, wherein the voice coils are annular when viewed in a direction parallel to the coil axis each having an inner circumference and an outer circumference and wherein the voice coils are arranged over one another in said direction;

a magnet system being designed to generate a magnetic field transverse to the conductors of the voice coils in the loop section; and a membrane, which is fixed to the coil arrangement and to the magnet system, wherein the membrane forms a first connector between the coil arrangement and the magnet system with a first compliance ($c_1$) and wherein the membrane together with the coil arrangement causes a first resonance frequency ($fres_1$) for an oscillation of the membrane in a direction parallel to the coil axis, wherein the speaker in addition comprises a second connector with a second compliance ($c_2$), wherein the second connector connects the voice coils of the coil arrangement, wherein the second connector together with the voice coils of the coil arrangement causes a second resonance frequency ($fres_2$) for the oscillation of the membrane in a direction parallel to the coil axis and wherein the second resonance frequency ($fres_2$) is above the first resonance frequency ($fres_1$).

2. The speaker as claimed in claim 1, wherein the second resonance frequency ($fres_2$) is below 30 kHz.

3. The speaker as claimed in claim 1, wherein the second resonance frequency ($fres_2$) is at least three times higher than the first resonance frequency ($fres_1$), in particular at least ten times higher than the first resonance frequency ($fres_1$).

4. The speaker as claimed in claim 1, wherein the coil arrangement comprises a first voice coil, which is mounted to the membrane, and a second voice coil, which is connected to the first voice coil by the second connector.

5. The speaker as claimed in claim 4, wherein a variable Kin the equation $$K_1=c_1\cdot(m_1+m_2+m_3)$$

is in a range of $1.0\cdot10^{-8}$ to $6.5\cdot10^{-7}$, in particular in a range of $2.5\cdot10^{-8}$ to $1.5\cdot10^{-7}$, wherein ($c_1$) is the first compliance, ($m_1$) is the mass of the first voice coil, ($m_2$) is the mass of the second voice coil and ($m_3$) is the mass of a rigid membrane part or dome of the membrane.

6. The speaker as claimed in claim 4, wherein a variable $K_2$ in the equation $$K_2=\frac{c_1\cdot c_2}{c_1+c_2}\cdot\frac{(m_1+m_3)\cdot m_2}{m_1+m_2+m_3}$$

is in a range of $1.0\cdot10^{-10}$ to $4.0\cdot10^{-10}$, in particular in a range of $2.0\cdot10^{-10}$ to $3.0\cdot10^{-10}$, wherein ($c_1$) is the first compliance, ($c_2$) is the second compliance, ($m_1$) is the mass of the first voice coil, ($m_2$) is the mass of the second voice coil and ($m_3$) is the mass of a rigid membrane part or dome of the membrane.

7. The speaker as claimed in claim 1, wherein a stiffness or spring constant of the second connector is in a range of 0.01 N/μm to 0.1 N/μm or a compliance ($c_2$) of the second connector is in a range of 10 μm/N to 100 μm/N respectively.

8. The speaker as claimed in claim 1, wherein a quality factor of the second resonance frequency ($fres_2$) caused by the second connector is in a range of 1 to 20.

9. The speaker as claimed in claim 1, wherein the second connector is embodied as or comprises a glue layer between the voice coils of the coil arrangement.

10. The speaker as claimed in claim 1, wherein the second connector comprises a plurality of sub parts, which each is embodied as or comprises a glue pad connecting the voice coils of the coil arrangement.

11. The speaker as claimed in claim 9 or 10, wherein the second connector is made of plastics having a Shore hardness from 00-5 to A-20 and/or an elongation at tear of more than 100%.

12. The speaker as claimed in claim 1, wherein the second connector comprises a plurality of sub parts, which each is embodied as or comprises a glue bead connecting the voice coils of the coil arrangement at their inner circumferences or outer circumferences.

13. The speaker as claimed in claim 12, wherein the second connector is made of plastics having a Shore hardness from A-20 to D-50 and/or an elongation at tear of more than 200%.

14. The speaker as claimed in claim 1, wherein the second connector comprises a plurality of sub parts, which each is embodied as a strip connecting the voice coils of the coil arrangement and which runs along the inner circumferences or outer circumferences of the connected voice coils and is attached thereto.

15. The speaker as claimed in claim 14, wherein the strip comprises one or more corrugations.

16. The speaker as claimed in claim 14, wherein the thickness of the strip is in a range of 5 μm to 50 μm, in particular in a range of 5 μm to 20 μm.

17. The speaker as claimed in claim 14, wherein the strip is made of or comprises a thermoplastic elastomer with a Young's Modulus of 2 MPa to 2 Gpa or a thermoplastic with a Young's Modulus of 100 MPa to 12 Gpa.

18. The speaker as claimed in claim 1, wherein the second connector comprises a plurality of sub parts, which each is embodied as a first spring arm connecting or coupling the voice coils of the coil arrangement and which together form a first spring arrangement.

19. The speaker as claimed in claim 18, additionally comprising a second spring arm arrangement of second spring arms each having a first end and a second end, wherein each of the second spring arms at its first end connects to the second voice coil, at its second end connects to a frame of the speaker and at a connecting point displaced from both end points connects to a first spring arm of the first spring arrangement.

20. The speaker as claimed in claim 18 or 19, wherein the first spring arms and/or second spring arms are made of or comprises a metal.

21. The speaker as claimed in claim 10, wherein the voice coils are shaped like a polygon when viewed in a direction parallel to the coil axis and wherein the sub parts are arranged in the corners of the polygon, in particular exclusively arranged in the corners of the polygon.

22. The speaker as claimed in claim 10, wherein the voice coils are shaped like a polygon when viewed in a direction parallel to the coil axis and wherein the sub parts are arranged at the longitudinal sides of the polygon, in particular exclusively arranged at the longitudinal sides.

23. The speaker as claimed in claim 1, wherein the second connector comprises a glue layer or glue pads between the voice coils of the coil arrangement and wherein the second connector in addition comprises glue beads, which connect the voice coils of the coil arrangement at their inner circumferences or outer circumferences.

24. The speaker as claimed in claim 23, wherein the glue layer or the glue pads reach to the inner circumferences of the voice coils at each of the glue beads arranged on said inner circumferences, and reach to the outer circumferences of the voice coils at each of the glue beads arranged on said outer circumferences.

25. The speaker as claimed in claim 23, wherein the voice coils are shaped like a polygon when viewed in a direction parallel to the coil axis and wherein the glue pads and the glue beads are arranged in the corners of the polygon.

26. The speaker as claimed in claim 25, wherein the second connector in addition comprises a plurality of strips connecting the voice coils of the coil arrangement which run along the inner circumferences or outer circumferences of the connected voice coils at the longitudinal sides of the polygon and which are attached thereto.

27. The speaker as claimed in claim 1, wherein the voice coils are shaped like a polygon when viewed in a direction parallel to the coil axis, the second connector comprises a glue layer or glue pads between the voice coils of the coil arrangement arranged in the corners of the polygon, and the second connector in addition comprises a plurality of strips connecting the voice coils of the coil arrangement which run along the inner circumferences or outer circumferences of the connected voice coils at the longitudinal sides of the polygon and which are attached thereto.

28. The speaker as claimed in claim 1, wherein the second connector additionally comprises a plurality of wires electrically connecting the voice coils of the coil arrangement.

29. The speaker as claimed in claim 1, wherein the voice coils are identical or are different.

30. The speaker as claimed in claim 1, wherein a distance or gap (g) between adjacent voice coils in their idle position is in range of 5 to 150 μm when measured in a direction parallel to the coil axis.

31. An electronic sound signal circuit, comprising:

a sound input being designed to receive a sound input signal (SI); and at least two sound outputs each being designed to feed a coil signal (SO1, SO2) to one of the voice coils of a coil arrangement of a speaker as claimed in claim 1, wherein the electronic sound signal circuit is designed to output coil signals (SO1, SO2) corresponding to the sound input signal (SI) in terms of their time course but being phase shifted to each other, wherein the phase shift (q) depends on the frequency (f) of the sound input signal (SI).

32. The electronic sound signal circuit as claimed in claim 31, wherein the phase shift (φ) is <5° below a threshold frequency (fthr) and rises above the threshold frequency (fthr).

33. The electronic sound signal circuit as claimed in claim 32, wherein the threshold frequency (fthr) is between the first resonance frequency ($fres_1$) and the second resonance frequency ($fres_2$).

34. The electronic sound signal circuit as claimed in claim 31, comprising an electronic phase shifter, which is provided to perform the phase shifting of the coil signals (SO1, SO2).

35. The electronic sound signal circuit as claimed in claim 31, wherein the maximum coil signals (SO1, SO2) output by the electronic sound signal circuit are smaller than coil signals (SO1, SO2), which cause a body contact between the voice coils of the coil arrangement.

36. The electronic sound signal circuit as claimed in claim 31, wherein the at least two sound outputs each are formed by two wires per voice coil.

37. The electronic sound signal circuit as claimed in claim 31, wherein the at least two sound outputs each are formed by a first single wire per voice coil and a second common wire, which is shared between two voice coils.

38. A sound system, comprising an electronic sound signal circuit as claimed in claim 31 and a speaker as claimed in claim 1, wherein the sound outputs of the electronic sound signal circuit each are connected with a voice coil of the coil arrangement.

39. A method of manufacturing a coil arrangement, comprising the steps of:

providing at least two voice coils, wherein each of the voice coils has an electrical conductor in the shape of loops running around a coil axis in a loop section and wherein the voice coils are annular when viewed in a direction parallel to the coil axis each having an inner circumference and an outer circumference;

applying a glue layer or glue pads on at least one of the voice coils of the coil arrangement;

arranging the voice coils over one another in a direction parallel to the coil axis;

connecting the voice coils of the coil arrangement by gluing them together by use of the glue layer or glue pads;

moving the voice coils to each other until a desired distance or gap (g) between the same is obtained, wherein the glue layer or glue pads reach(es) to the inner circumferences of the voice coils at each position of a desired glue bead arranged on the inner circumferences of the voice coils and to the outer circumferences of the voice coils at each position of a desired glue bead arranged on the outer circumferences of the voice coils; and additionally connecting the voice coils of the coil arrangement by applying glue beads to the voice coils at the aforementioned positions.

* * * * *